(12) United States Patent
Gonos

(10) Patent No.: US 7,356,458 B1
(45) Date of Patent: Apr. 8, 2008

(54) MULTI-LANGUAGE CORRESPONDENCE/FORM GENERATOR

(75) Inventor: Dan G. Gonos, Folsom, CA (US)

(73) Assignee: Electronic Data Systems Corporation, Plano, TX (US)

( * ) Notice: Subject to any disclaimer, the term of this patent is extended or adjusted under 35 U.S.C. 154(b) by 947 days.

(21) Appl. No.: 10/180,462

(22) Filed: Jun. 27, 2002

(51) Int. Cl.
*G06F 17/20* (2006.01)
*G06F 17/27* (2006.01)

(52) U.S. Cl. .............................................. 704/8; 704/9
(58) Field of Classification Search ................ 704/277, 704/8, 9
See application file for complete search history.

(56) References Cited

U.S. PATENT DOCUMENTS

| | | | |
|---|---|---|---|
| 4,539,653 A | | 9/1985 | Bartlett et al. |
| 5,181,162 A | | 1/1993 | Smith et al. |
| 6,139,201 A | * | 10/2000 | Carbonell et al. ............. 704/2 |
| 6,370,535 B1 | * | 4/2002 | Shapiro et al. ............. 707/100 |
| 6,446,115 B2 | | 9/2002 | Powers |
| 6,460,042 B1 | | 10/2002 | Hitchcock et al. |
| 6,473,892 B1 | | 10/2002 | Porter |
| 6,623,529 B1 | * | 9/2003 | Lakritz ....................... 715/536 |
| 6,658,627 B1 | * | 12/2003 | Gallup et al. ............... 715/536 |
| 6,813,747 B1 | * | 11/2004 | Taieb .......................... 715/542 |
| 6,845,483 B1 | * | 1/2005 | Carroll ....................... 715/513 |
| 6,865,716 B1 | * | 3/2005 | Thurston .................... 715/536 |
| 6,990,633 B1 | * | 1/2006 | Miyasaka et al. ........... 715/517 |
| 2002/0002567 A1 | * | 1/2002 | Kanie et al. ................. 707/513 |
| 2002/0007279 A1 | * | 1/2002 | Matsuda et al. ............. 704/277 |
| 2002/0077805 A1 | * | 6/2002 | Hecht et al. .................... 704/2 |
| 2003/0005159 A1 | * | 1/2003 | Kumhyr ...................... 709/246 |

* cited by examiner

*Primary Examiner*—Tālivaldis Ivars Šmits
(74) *Attorney, Agent, or Firm*—Fish & Richardson, PC

(57) ABSTRACT

A method to automatically generate correspondence in multiple languages includes identifying format data portions and content data portions for pieces of correspondence, storing the format data portions and content data portions in a database capable of directly storing blocks of text in both single-byte and multi-byte languages, receiving a request for generation of a piece of correspondence in a multi-byte language, accessing the database to obtain the format data portion and the content data portion of the requested piece of correspondence, and automatically generating the requested piece of correspondence. Each of the format data portions of the pieces of correspondence includes a layout and a style of a corresponding piece of correspondence, and each of the content data portions includes standard text having fixed content for all instances of the corresponding piece of correspondence and variable text having content that varies for different instances of the corresponding piece of correspondence. Automatically generating the requested piece of correspondence includes retrieving values for the variable text of the content data portion from a second database and using the format data portion to combine and format the standard text and the variable text corresponding to the retrieved values.

39 Claims, 24 Drawing Sheets

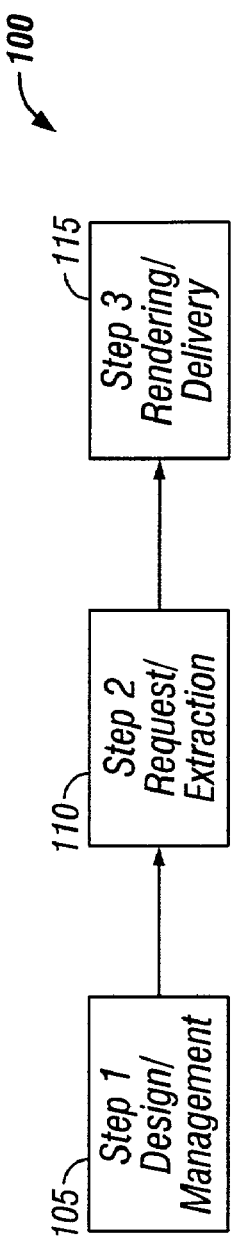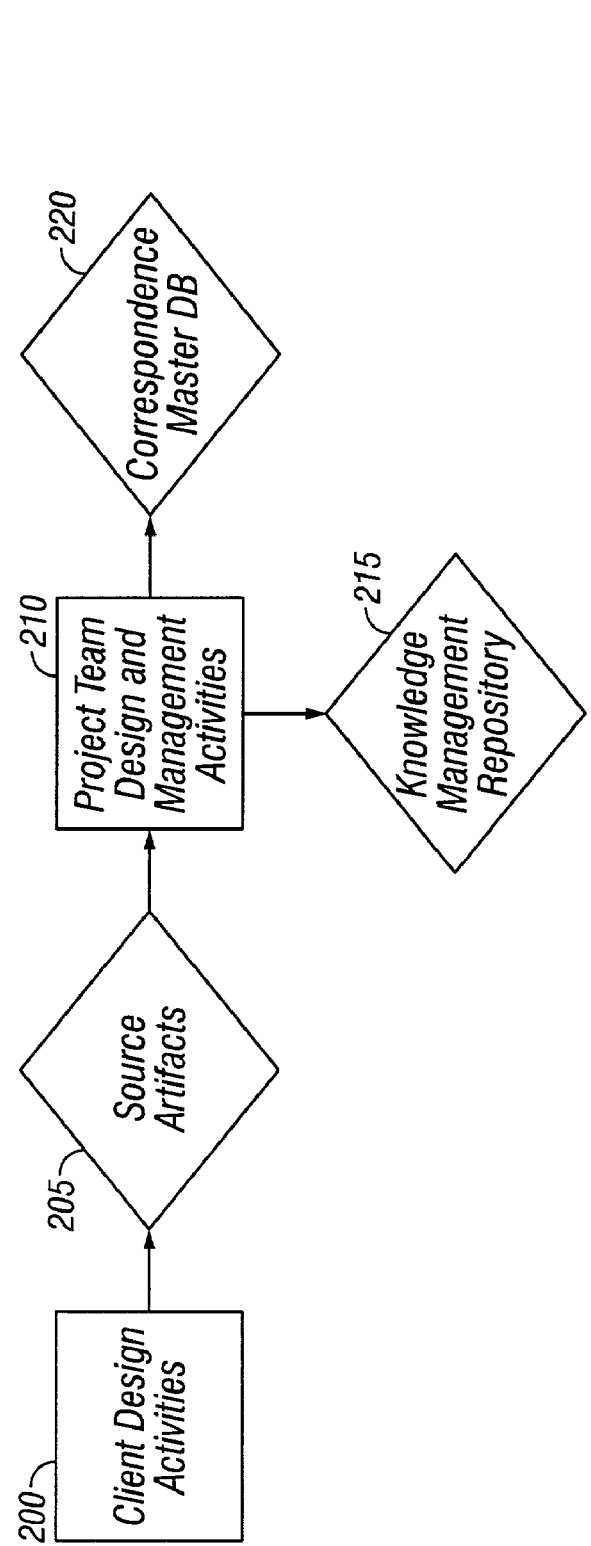

State of California-Health and Welfare Agency
NOTICE OF ACTION

California Department of Social Services

County of Yolo

Case Name: Joe Client
Case Number: 57-30-1234567-1
Worker Name: Sample Worker
Worker Phone Number: 916 555-1212

State Hearing:

If you are dissatisfied with this action, your aid may continue unchanged if you ask for a State Hearing before the effective date of this action. Read the back for important information about your right to appeal this action.

| Budget for: | August 2000 |
|---|---|
| Self-employment Income | $0.00 |
| Deduction (40% or Actual) | - 0.00 |
| Net Self-Employment Income | 0.00 |

Joe Client

174 John Henry Circle
Apt 6a
Folsom, CA. 95630

235 — Your monthly aid payment received under the Refugee Resettlement Program or Cuban/Haitian Entrant Program will be decreased from $938.00 to $426.00 on the effective date May 15, 2002 shown below. Your aid payment is based on the number of persons in your household, John Sample and Pete Sample will be discontinued from cash aid and cash-based Medi-Cal effective May 15, 2002

*FIG. 2B-1*

These changes are required by Federal regulations which limit refugee/entrant aid payments and cash-based Medi-Cal eligibility to 8 months from the person's month and year of entry into the United States. It has been determined from a review of immigration documents that John Sample and Pete Sample will have exceeded this period of eligibility on the effective date shown above.

| | |
|---|---|
| Other Earned Income | 2000.00 |
| Standard Earned Income Deduction | -225.00 |
| Net Earned Income | 1775.00 |
| Disability Income | 0.00 |
| Balance of Standard Earned Income Deduction | -0.00 |
| Net Disability Income | 0.00 |
| Other Income | 0.00 |
| Total Countable Income | 1775.00 |
| Basic Need for 2 persons | 560.00 |
| Less Total Countable Income | -1775.00 |
| Potential Grant | 0.00 |

*FIG. 2B-2*

Maximum Aid for 2 persons        490.00

Grant Amount                     $0.00

Laws requiring this action:

Section 412 of the Refugee Act of 1980 (Public Law 96-212) or section 501 of the Refugee Education Assistance Act of 1980 (Public Law 96-422), as implemented by 45 CFR parts 400 and 401; 45 CFR 205.10; California Administrative Code Title 22, Sections 50183(a)(3) and 50227.

NA 991 (11/99) RCA/ECA, MC-Decrease/Expiration (Time-Expiration)

FIG. 2B-3

STATE OF CALIFORNIA-HEALTH AND HUMAN SERVICES AGENCY

California Department of Social Services

⟵ 230

Notice of Action

*If you have questions or want more information about this notice, please contact your worker.*

Case Name:
Case Number:
Worker:
Phone:
Date:

☐ Your monthly aid payment received under the Refugee Resettlement Program or Cuban/Haitian Entrant Program will be decreased from $ <u>938.00</u> to $ <u>426.00</u> on the effective date shown below. Your aid payment is based on the number of persons in your household, and the following persons will be discontinued from cash aid and cash-based Medi-Cal effective <u>May 15, 2002</u>
Persons: <u>John Sample</u>   <u>Pete Sample</u>

Computation of Monthly Aid Payment        Net Nonexempt Income Computation        Name  Name  Name Total Earned Income                            ___   ___   ___

Inc. Tax. Soc. Sec. and Disab. Ins.         −___  −___  −___
Standard Work Expense Disregard             −___  −___  −___
Dependent Care Expense Disregard            −___  −___  −___
                               Subtotal     =___  =___  =___
Other Countable Income                      +___  +___  +___

Maximum Aid Payment for ___ Persons
Special Needs (Specify) ___                       +___

Net Nonexempt Income                              +___        Court Order Child Spousal Support Paid  −___
  Total Grant                                     =___          • Net Nonexempt Income                =___
Overpayment Adjustment (see page ___)             −___        or
Monthly Aid Payment                               =___          • Net Nonexempt Income Total (columns 1+2+3) ___

⎱
245  ☐  Your monthly aid payment and cash-based Medi-Cal received under the Refugee Resettlement Program
⎰       or Cuban/Haitian Entrant Program will be discontinued effective _____

☐  You will receive a separate Notice of Medi-Cal-Only eligibility.

☐  Other Medi-Cal Action: _____

*FIG. 2C-2*

Reason:

These changes are required by Federal regulations which limit refugee/entrant aid payments and cash-based Medi-Cal eligibility to 8 months from the person's month and year of entry into the United States. It has been determined from a review of immigration documents that you or the persons named above will have exceeded this period of eligibility on the effective date shown above.

Laws requiring this action:

Section 412 of the Refugee Act of 1980 (Public Law 96-212) or Section 501 of the Refugee Education Assistance Act of 1980 (Public Law 96-422), as implemented by 45 CFR parts 400 and 401, 45 CFR 205.10: California Administrative Code Title 22, Sections 50183(a)(3) and 50227.

Comments:

You or the persons discontinued may be eligible for further cash aid through other aid programs. Please contact your County Welfare Department for more information. Refugees/Entrants receiving aid payments under the AFDC Program are not affected by this notice or the 8-month eligibility limit.

State welfare regulations are available for review at the local office of the County Welfare Department.

Information about family planning services is available from the County Welfare Department on request.

State Hearing. If you are dissatisfied with this action, your aid may continue unchanged if you ask for a State Hearing before the effective date of the action. Read the back for important information about your right to appeal this action.

NA 991(11/99) RCA/ECA, MC-Decrease/Expiration (Time-Expiration)

MULTI-LANGUAGE CORRESPONDENCE/FORM GENERATOR

TECHNICAL FIELD

This application relates to automated correspondence generation systems and specifically to automated correspondence generation systems able to generate correspondence in multiple languages.

BACKGROUND

Automated correspondence generation systems often use either a "native" approach or a "flash" approach to generate correspondence. The native approach builds up each piece of correspondence one block at a time. This approach is very flexible in that the system is able to generate a wide variety of correspondence through the use of dynamic text. Dynamic text is text that is inserted or not inserted based on whether a certain condition exists.

The "flash" approach digitizes a correspondence template and then allows variable text, which is text that is inserted from client specific information, to be overlaid on the digitized image. This is usually accomplished by specifying the x and y coordinates at which the variable text should be placed. The digitized image of the template is then "flashed" on the printer and the variable text is printed over it. In general, the flash approach does not support dynamic text and, therefore, is somewhat limited in the variety of correspondence that can be automatically generated. While the native approach can quickly and efficiently generate all combinations of dynamic text strings or blocks in a given piece of correspondence, the flash approach typically stores each combination as a separate digitized template image. This may become unmanageable and inefficient as the number of conditions increase and the combinations of dynamic text strings or blocks multiply.

The approach used by an automated system to generate correspondence often depends on the language of the correspondence that must be supported by the system. For example, the native approach typically is used for languages that have a character set in which each character is represented by a single byte (e.g., the ASCII character set used to represent the English language). Most Western languages are single-byte languages.

The flash approach, on the other hand, is used for languages that have a character set in which each character is represented by multiple bytes. Most Eastern languages are multi-byte languages.

SUMMARY

In one general aspect, automatically generating correspondence in multiple languages includes identifying format data portions and content data portions for pieces of correspondence, storing the format data portions and content data portions in a database capable of directly storing blocks of text in both single-byte and multi-byte languages, receiving a request for generation of a piece of correspondence in a multi-byte language, accessing the database to obtain the format data portion and the content data portion of the requested piece of correspondence, and automatically generating the requested piece of correspondence. A format data portion of a piece of correspondence includes a layout and a style of a corresponding piece of correspondence. A content data portion includes standard text having fixed content for all instances of the corresponding piece of correspondence and variable text having content that varies for different instances of the corresponding piece of correspondence. Automatically generating the requested piece of correspondence includes retrieving values for the variable text of the content data portion from a second database and using the format data portion to combine and format the standard text and the variable text corresponding to the retrieved values.

Implementations may include one or more of the following features. For example, identifying the content data portions of the pieces of correspondence may further include identifying dynamic text that is inserted in the piece of correspondence based on the presence of some condition.

Receiving a request for generation of a piece of correspondence may include automatically receiving a request from a computer upon the occurrence of a triggering event. The triggering event may be a business event that initiates production of the piece of correspondence. The triggering event data may be stored in the second database. Receiving a request for generation of a piece of correspondence also may include receiving a request from a user using a desktop application.

Automatically generating the requested piece of correspondence may include forming at least one block of text by accessing the database to retrieve the standard text for each block from the content data portion corresponding to the requested piece of correspondence, retrieving values for the variable text of the content data portion for each block from a second database, merging the standard text and the variable text corresponding to the retrieved values into corresponding text, and formatting the text by accessing the format data portion corresponding to the requested piece of correspondence from the database and applying the style and layout of the format data portion to the text. The formatting may include changing the placement, font, and weight of the text and inserting the text in an overall structure of the piece of correspondence. The overall structure of the piece of correspondence may include one or more lines, boxes, or graphics.

Identifying the format data portions and the content data portions may include gathering source files for each piece of correspondence, gathering language translation files for each piece of correspondence, and processing the source files and the language translation files to facilitate access and use of the data to generate pieces of correspondence. The source files may include the layout, the style, the standard text in all supported languages, and the placement of the variable text and dynamic text for each piece of correspondence. The language translation files may include dynamic text in all supported languages and the location of any variable text within the dynamic text for each piece of correspondence.

Processing the source files and the language translation files may include transforming the layout of the source files for each piece of correspondence into printer control language macros and identifying and extracting the variable text and the placement of dynamic text for each piece of correspondence in preparation for storage. Processing the source files may also include identifying a placement of the variable text of each piece of correspondence from the source files and mapping the placement to a variable extract function.

The source files and the language translation files may be registered in a third database to establish a chain of custody.

In another general aspect, a system for automatically generating correspondence in multiple languages includes a first data store that stores the format data portions and content data portions for pieces of correspondence. A request generation processor generates a request for generation of correspondence in a multi-byte language. A second data store stores the variable text of the content data portion for the requested piece of correspondence, and an extraction processor accesses the second data store to retrieve values for the variable text of the content data portion for the requested piece of correspondence. A rendering and delivery processor accesses the first data store to obtain the format data portion and the content data portion for the requested piece of correspondence. The rendering and delivery processor automatically generates the requested piece of correspondence by using the format data portion to combine and format the standard text and the variable text corresponding to the retrieved values. The request generation processor, the extraction processor, and the rendering and delivery processor may be implemented as a single processor.

Implementations may include one or more of the following features. For example, the rendering and delivery processor may include a formatter processor to automatically generate the requested piece of correspondence, a rendering driver processor to create a printable version of the requested piece of correspondence, and a renderer processor to manage and coordinate information flow between the formatter processor and the rendering driver processor. The rendering and delivery processor may further include a converter processor to create a viewable version of the requested piece of correspondence.

The system may further include a printer capable of generating a printed version of the correspondence.

In another general aspect, a computer system includes a computer program for automatically generating correspondence in multiple languages. The computer program may include code segments to identify format data portions and content data portions for pieces of correspondence, store the format data portions and content data portions in a database capable of directly storing blocks of text in both single-byte and multi-byte languages, receive a request for generation of a piece of correspondence in a multi-byte language, access the database to obtain the format data portion and the content data portion for the requested piece of correspondence, and automatically generate the requested piece of correspondence by retrieving values for the variable text of the content data portion from a second database and using the format data portion to combine and format the standard text and the variable text corresponding to the retrieved values.

The described systems and techniques permit correspondence to be presented in a consistent format for a variety of languages. By contrast, use of a combination of the native and flash approaches could result in inconsistent presentations. In particular, the presentation of correspondence generated using the native approach often will differ from that generated using the flash approach. In general, correspondence with dynamic text blocks or strings will be presented accurately and consistently in the languages supported by the native approach (i.e., the single-byte languages). However, this correspondence will not necessarily be represented equivalently in the languages supported by the flash approach (i.e., the multiple-byte languages). Because the flash approach is not as well equipped to handle dynamic text, and because digitizing every combination of dynamic text that may occur in a given piece of correspondence may be unmanageable, the dynamic text may be modified and, potentially, the translation compromised to permit multiple possible combinations of dynamic text in a given correspondence to be included in a single digitized template. This may prevent correspondence generated using the native approach from being the one-to-one equivalent of that generated using the flash approach.

The described systems and techniques are also particularly adept at supporting legal language. By contrast, the translation of dynamic text of correspondence generated using the native approach may be compromised due to the limitations of the flash approach in a system that combines the two approaches. When the dynamic text is legal language, any compromises in its translation may be highly problematic because the meaning and effect of such legal language can change drastically even with minor changes.

The described systems and techniques may also lend themselves to simplifying data management by consolidating the correspondences in a single integrated database structure.

Other features will be apparent from the following description, including the drawings, and the claims.

DESCRIPTION OF DRAWINGS

FIG. 2A is a flow chart of a process for implementing a design/management step of the process of FIG. 1.

FIG. 2B shows an exemplary "non-flash" piece of correspondence.

FIG. 2C shows an exemplary "flash" piece of correspondence.

DETAILED DESCRIPTION

Figure 3A:
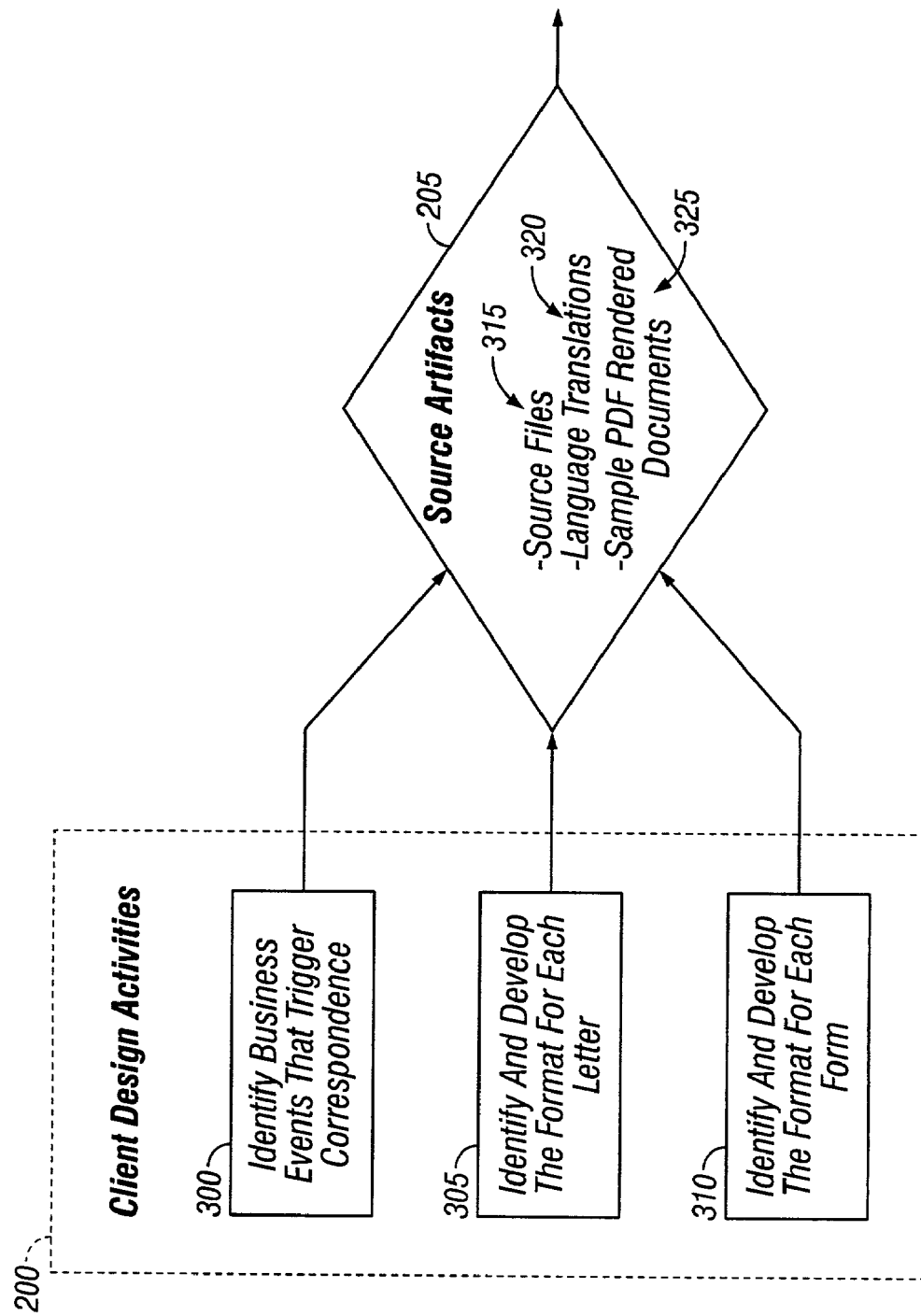
FIG. 3A is a flow chart of a process for implementing a client design activities step of the process of FIG. 2A.
Figures 1, 3B:
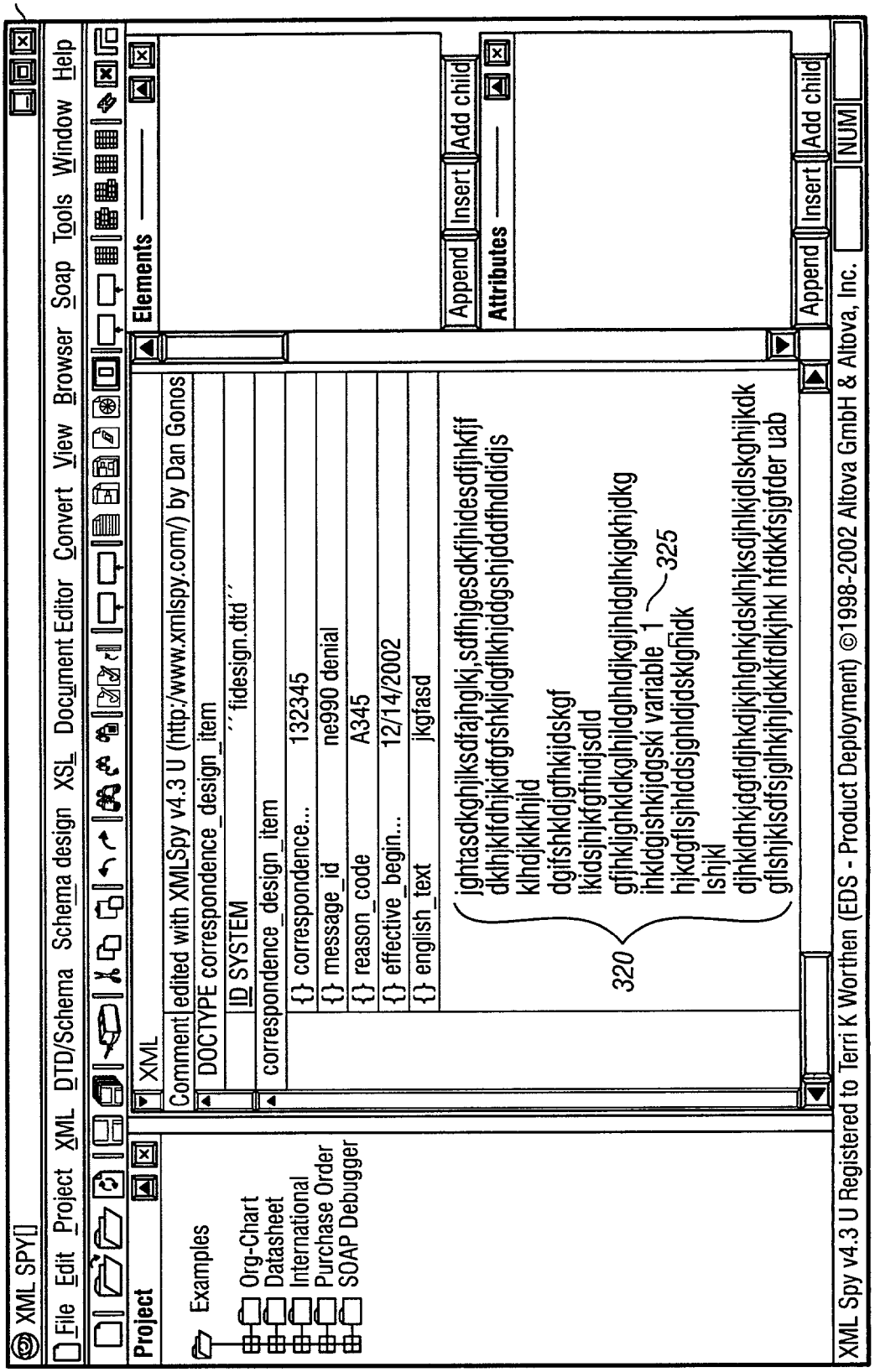
FIG. 1 is a flow chart of a process used to generate multi-language correspondence.
FIG. 3B shows an example of a XML foreign language capture tool.
Figures 2, 3B:
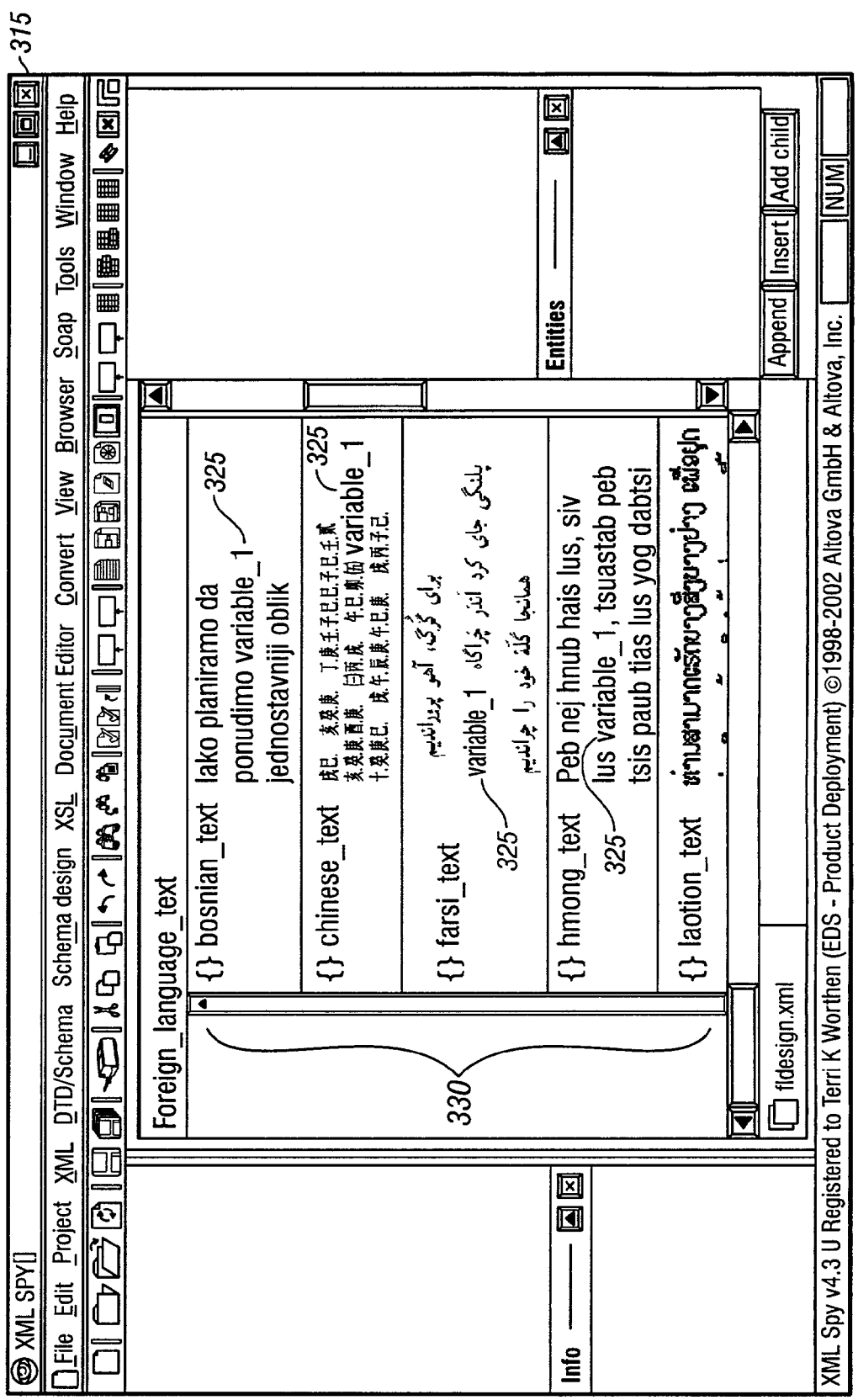

Referring to FIG. 1, a process 100 may be used to internationalize and automate correspondence. The process 100 includes three high-level steps: (1) a design/management step 105; (2) a request/extraction step 110; and (3) a rendering/delivery step 115. These steps are taken in sequential order and involve activities by both the client (i.e., a business entity) that will be using the system to generate correspondence and the project team that will create and maintain the system. The project team may or may not be part of the client.

FIGS. 2-13 illustrate the three high-level steps of the process 100 in more detail. In particular, the figures show flow diagrams in which activity/processing steps are represented by rectangles and input and output data objects are represented by diamonds.

Referring to FIG. 2A, the design/management step 105 includes client design activities (step 200) and project team design and management activities (step 210). The client design activities 200 produce source artifacts 205 that are used in the project team design and management activities 210 to produce a knowledge management repository 215 and a correspondence master database 220. The main end product of the design/management step 105 is the correspondence database 220, which contains all of the supporting structures used by the system to generate correspondence in the supported languages.

The correspondence master database 220 is able to store text written in both single-byte and multi-byte languages (i.e., the database compresses and manages the data in such a way that multiple-byte character representations are preserved). The database 220 may be, for example, an Oracle National Language Support database.

The database 220 is critically important to the multilanguage correspondence generation system because it allows the system to directly store blocks and strings of text in multi-byte languages and to use these blocks and strings to build correspondence piece by piece. This database, if built and managed in accordance with the process 100, allows the native approach to be used for all correspondence in all supported languages, regardless of whether the language is multi-byte or single-byte. This allows the system to use dynamic text to produce a wide variety of correspondences in all supported languages using a single integrated database system that is relatively easy to manage.

FIG. 2B shows an example of a "non-flash" correspondence 225 generated in English using the native approach. The correspondence generation process 100 is able to generate an equivalent correspondence in all supported languages, including multi-byte languages. This is in contrast with generation systems that are forced to use the flash approach when generating correspondence in multi-byte languages.

FIG. 2C shows an example of a "flash" correspondence 230 equivalent to the correspondence 225 but generated using the flash approach. The flash approach typically uses blanks to facilitate the insertion of client specific variable text and checkboxes to distinguish between blocks of text relevant to the current communication (i.e., the box is checked) or irrelevant to the current communication (i.e., the box is not checked). The native approach, on the other hand, is able to build up the correspondence block by block and completely omit irrelevant dynamic text. Accordingly, the native approach is able to build a paragraph 235 (FIG. 2B) of non-flash correspondence 225 to correspond to text block 240 (FIG. 2C) of the flash correspondence 230. Note that text block 240 conveys the same information as paragraph 235 but is necessarily worded differently due to the structure imposed upon the letter by the flash approach. This rewording may be problematic when applied to legal language.

Furthermore, unused text blocks 245 of the flash correspondence 230 are completely omitted from the non-flash correspondence 225 because they are irrelevant to the current communication. Omission of irrelevant text allows pieces of correspondence to be tailored to each individual recipient and allows a particular form to support a greater variety of dynamic text.

The client design activities (step 200) involve the gathering and design of the correspondence that will be automatically generated by the system. As shown in FIG. 3A, the client design activities include identifying the business events that result in the generation of correspondence (step 300) and identifying and developing the format for each letter (step 305) and each form (step 310).

Identifying and developing the format for each letter (step 305) and form (step 310) includes the identification and development of the following: (1) the layout, which is the overall structure of the letter/form, including lines, boxes, and graphics; (2) the standard text, which is the text on the letter/form that never changes; (3) the location of the variable text, which is the text that is inserted from client specific information; (4) the dynamic text, which is the text that is inserted based on the presence of some condition; (5) the style sheet, which is the placement, font, and weight of text; and (6) the triggering event, which is the business event that initiates the production of the letter/form.

The end products of the client design activities (step 200) are source artifacts 205. The source artifacts are divided into three groups of artifacts: source files 315, language translations 320, and sample portable document format (PDF) rendered documents 325.

The source files 315 include the form or letter in the native tool (e.g., Quark, Microsoft Word, and Visio) in which the form or letter was created and a separate spreadsheet containing the triggering business events. The source files 315 provide the layout, the standard text in all supported languages, the placement of variable and dynamic text, and the style sheet information for the form or letter. The client may use a third party foreign language capture tool, such as XML-Spy, to translate and capture the foreign language text and present the text in a useful format, such as XML ("extensible markup language"). XML is a language similar to hypertext markup language (HTML) but with the additional flexibility of being able to describe data structures that can be processed directly as data by a program. XML offers a way to create a flexible common information format capable of supporting both the multi-byte and single-byte language data. This flexible format facilitates the subsequent processing of the source artifacts 315 by the project team in step 210 and simplifies storing the information in the correspondence master database 220.

Figures 1, 3C:
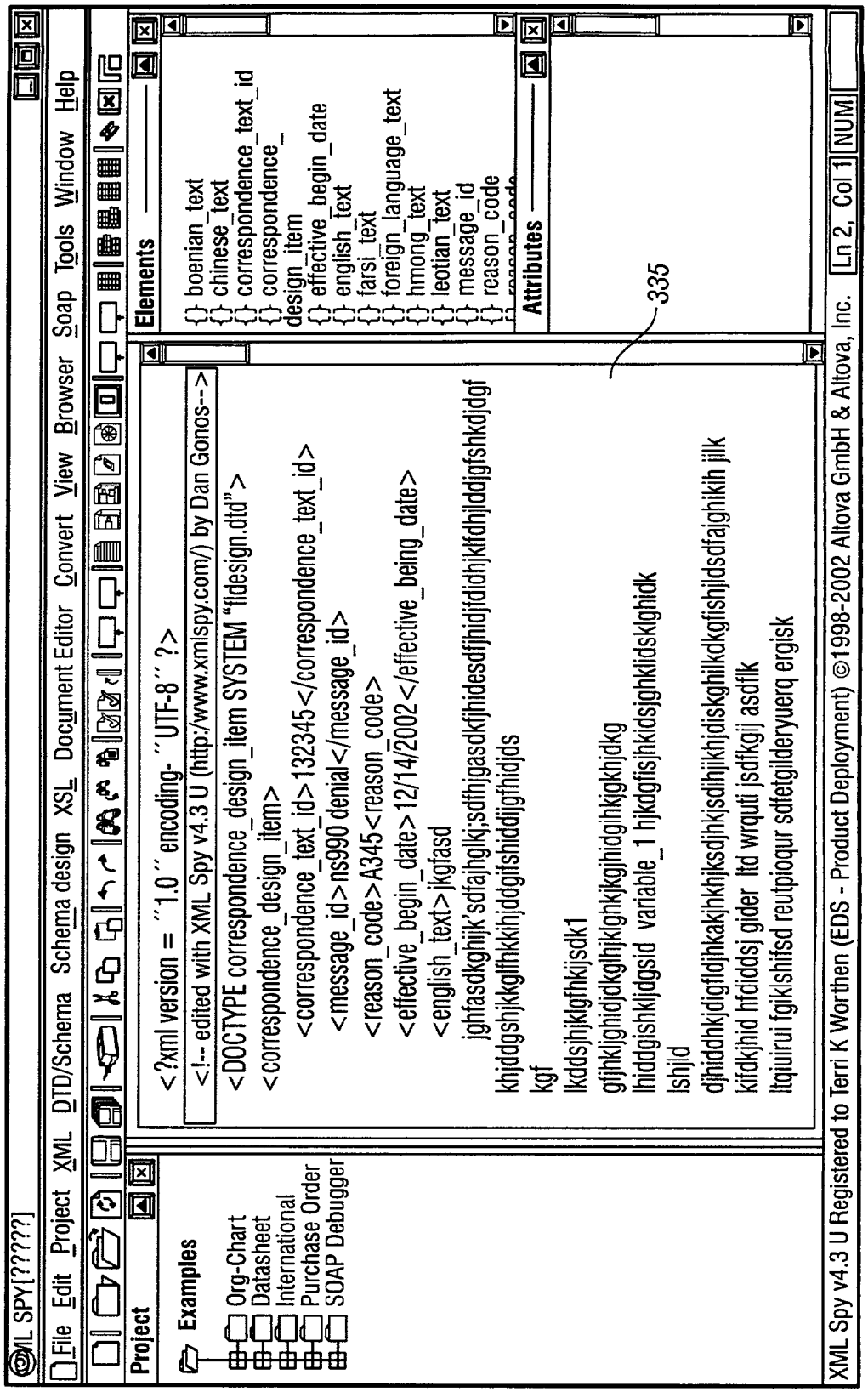
FIG. 3C shows an example of a XML-formatted output of multi-language text captured by the foreign language capture tool of FIG. 3B.
Figures 2, 3C:
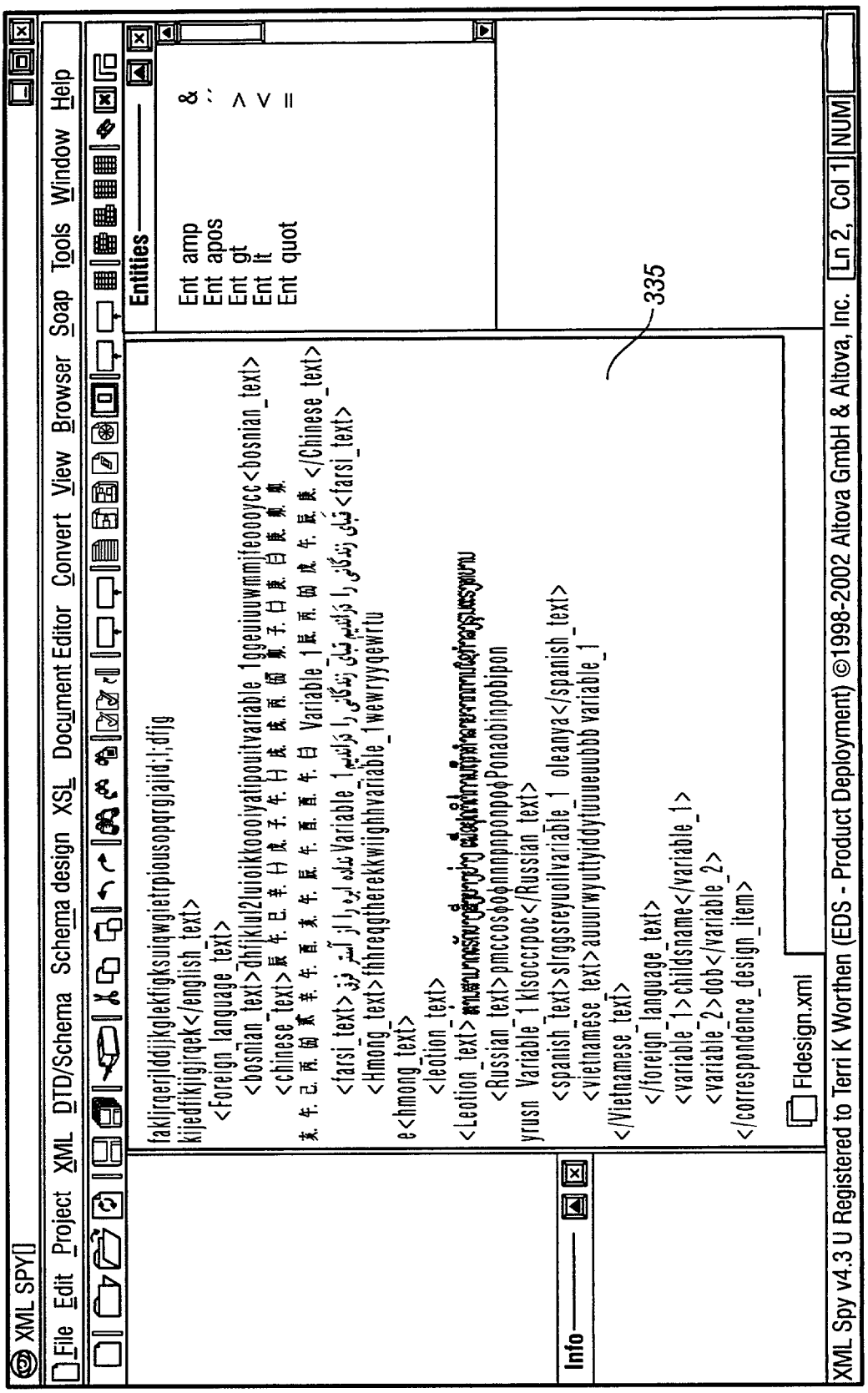

Referring to FIG. 3B, XML-Spy allows entry of English text 320 with variable text placement 325. Foreign language text 330 that corresponds to the English text 320 may also be entered. The XML-formatted output 335 is shown in FIG. 3C.

The language translations 320 include the English and foreign language dynamic text, along with the placement of any variable text within the dynamic text. The language translation information is entered in a project-defined structure using a third party tool with input method editor (IME) support. Also called front-end processors, IMEs are applets that allow the user to use a standard 101-key keyboard to enter the thousands of different characters used in certain written languages. XML-Spy may be used as the third party tool to capture the language translations 320 and present them in a common data format.

The sample PDF rendered documents 325 provide a view of what the letter or form is supposed to look like once it is created by the system. This gives the project team an idea of what the client believes the correspondence end product should look like and thereby facilitates the design of the system.

Figure 4:
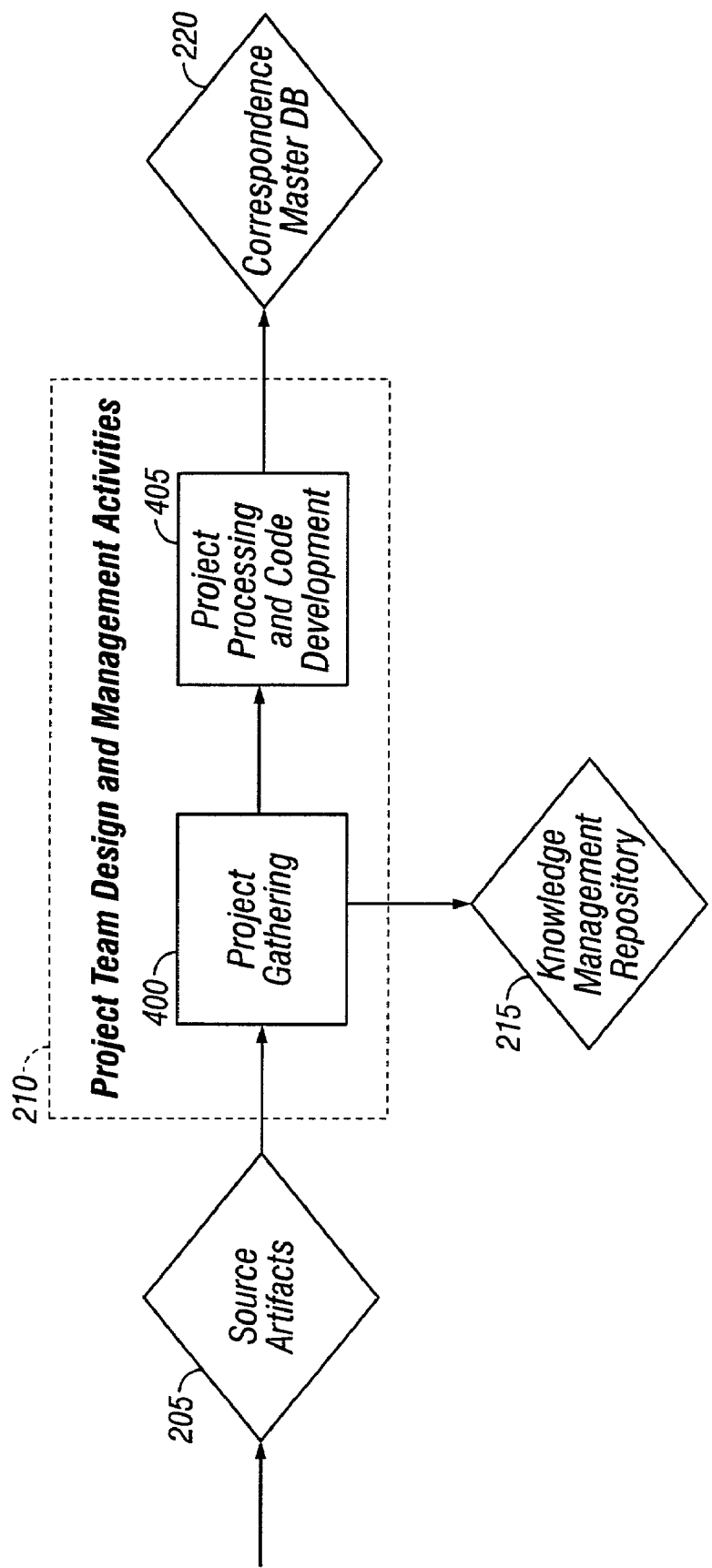
FIG. 4 is a flow chart of a process for implementing a project team design and management activities step of the process of FIG. 2A.

Referring to FIG. 4, the source artifacts 205 are used by the project team in the design and management activities (step 210). These activities include project gathering (step 400) and project processing and code development (step 405). The project gathering (step 400) activity includes registering and storing the source artifacts 205 in the knowledge management repository 215. The registration process establishes a "chain of custody" from the party ultimately responsible for the content and format of the correspondence. The repository 215 contains protected and registered copies of the artifacts 205. Subsequent processes use these registered copies rather than the original source artifacts 205. The project processing and code development activity (step 405) processes these registered source artifacts and stores them in the correspondence master database 220. For the sake of brevity, the subsequent description of the processing and code development activity (step 405) will not distinguish between the registered source artifacts and the source artifacts 205. Aside from the custodial tracking function of registration, the registered artifacts are functionally indistinguishable from the source artifacts 205.

Figure 5:
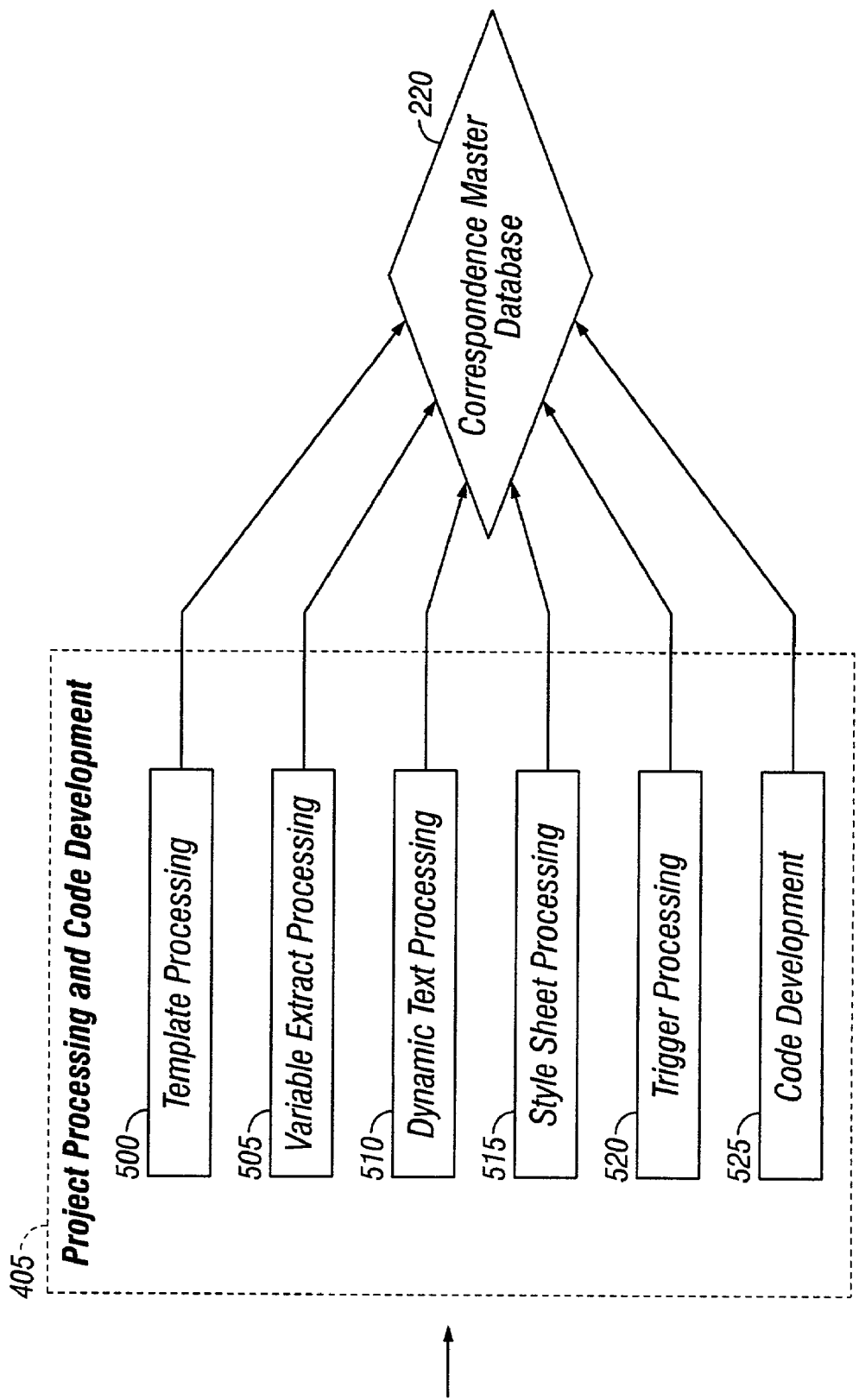
FIG. 5 is a flow chart of a process for implementing a project processing and code development step of the process of FIG. 2A.

Referring to FIG. 5, the project processing and code development (step 405) includes template processing (step 500), variable extract processing (step 505), dynamic text processing (step 510), style sheet processing (step 515), trigger processing (step 520), and code development (step 525).

The template processing (step 500) includes touching up the letter/form layouts and transforming them into printer control language (PCL) macros. Specifically, the source files 315 are edited in the native tool (e.g., Quark, Microsoft Word, or Visio) in which the form or letter was created, converted into PCL macros, and stored in the correspondence master database 220 for processing.

The variable extract processing (step 505) includes identifying the placement of the variable text of a letter/form from the source files 315 and the language translations 320, mapping that variable text placement to a corresponding variable extract function, and storing it in the correspondence master database 220 for processing. An example of a variable is "Client Name."

The dynamic text processing (step 510) includes identifying the dynamic text and the placement of the dynamic text from the source files 315 and the language translations 320 and storing them in the correspondence master database 220 for processing. An example of dynamic text is "your income benefits have been terminated."

The style sheet processing (step 515) includes identifying the style sheet information from the source files 315 for each textual item processed and placed on a letter/form. Specifically, the source files 315 are edited in the native tool that created them, the style sheet information is extracted for each textual item, and then the style sheet information is stored in the correspondence master database 220 for processing. An example of style sheet information is:

Client Address
Typeface: Arial
Pointsize: 12
X-coordinate: 3
Y-coordinate: 4

The trigger processing (step 520) includes identifying the triggering business events, linking them to their corresponding source artifacts 205, and storing them in the correspondence master database 220 for processing. After the system has been set up by the project team, the client may carry out this processing itself as new business events that trigger correspondence arise.

The code development 525 includes the development of new program logic to process new business conditions, variable text, or dynamic text. This includes programming new variable extract functions for variable text that does not correspond to any existing extract function.

The end product of the design/management step 105 is the correspondence master database 220. Before deployment, the database 220 is replicated into a production correspondence master database which is used for both the request/extraction step 110 and the rendering/deliver step 115. The production correspondence master database contains the production ready correspondence components for the client. If multiple clients use the same correspondence master database, a production correspondence master database will be created for each by simply copying the correspondence master database 220 multiple times. The production correspondence database also serves as a back up of the correspondence master database 220. For the sake of brevity, the rest of this discussion will not distinguish between the production correspondence master database and the correspondence master database 220, since these two databases are identical.

Figure 6:
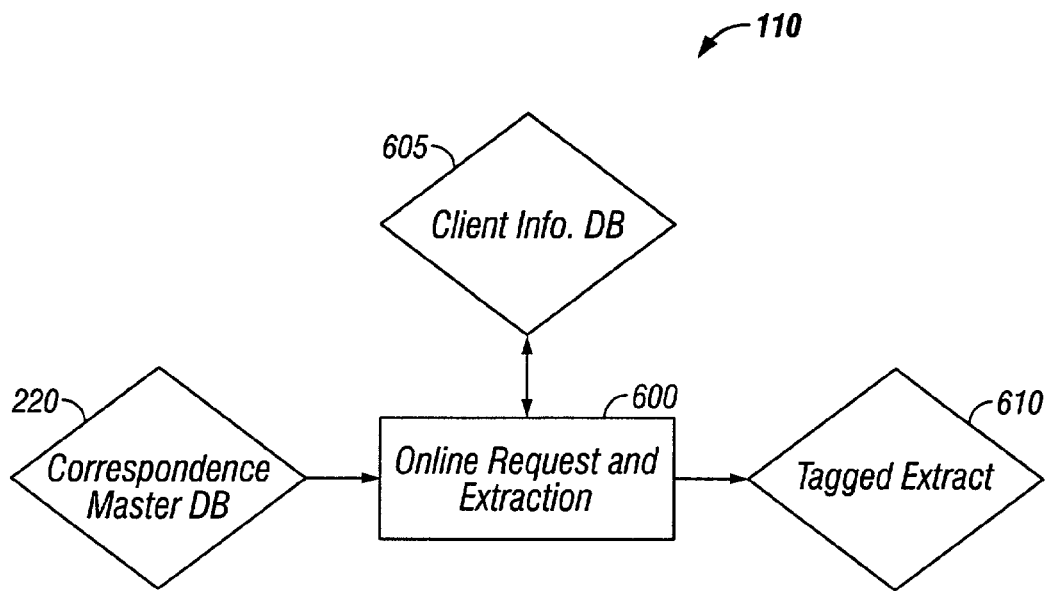
FIG. 6 is a flow chart of a process for implementing a request/extraction step of the process of FIG. 1.
Figure 7:
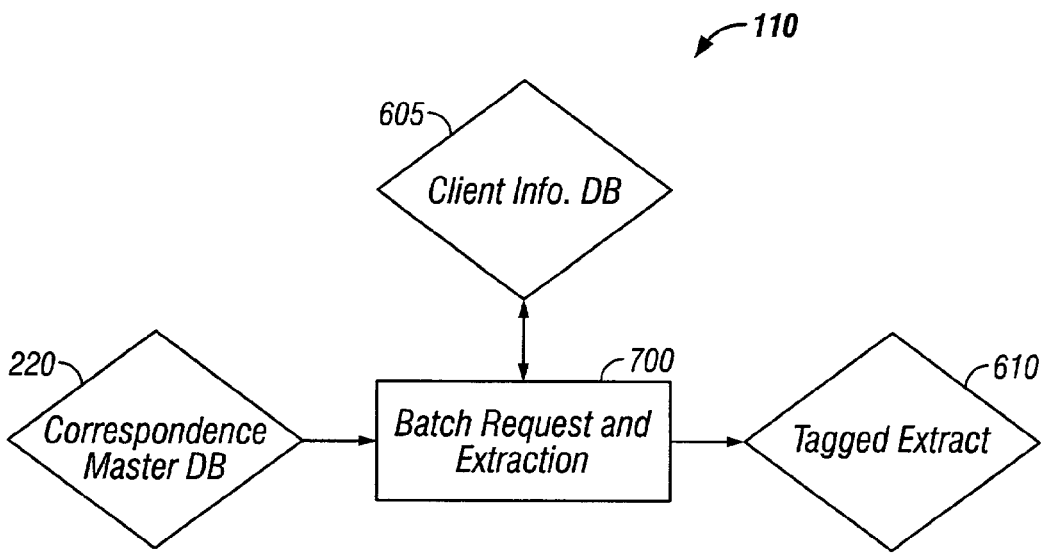
FIG. 7 is a flow chart of another process for implementing a request/extraction step of the process of FIG. 1.

Once the environment has been staged with the client specific correspondence support in the correspondence master database 220, correspondence can be requested and client specific information can be extracted in the request/extraction step 110. Referring to FIGS. 6 and 7, correspondence generation requests come in two forms: (1) online requests, which generate a single piece of correspondence and are handled through transaction processing; and (2) batch requests, which generate multiple pieces of correspondence and are handled automatically by the system upon the occurrence of the business event triggers (e.g. periodic reports). Online requests are real time requests made by a user of the system. Batch requests, on the other hand, are initiated by the system itself and are typically handled overnight.

Figure 8A:
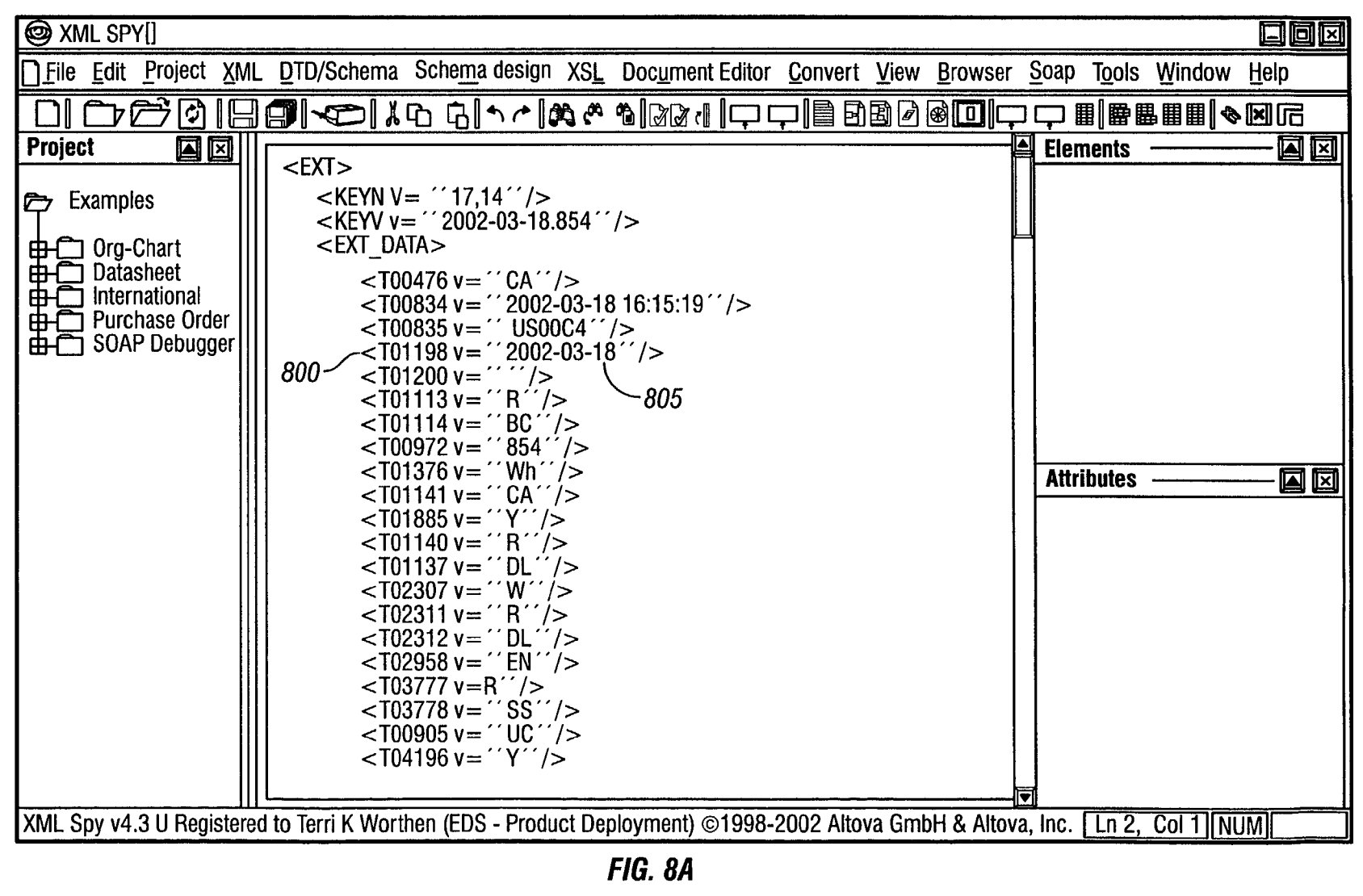
Figure 8B:
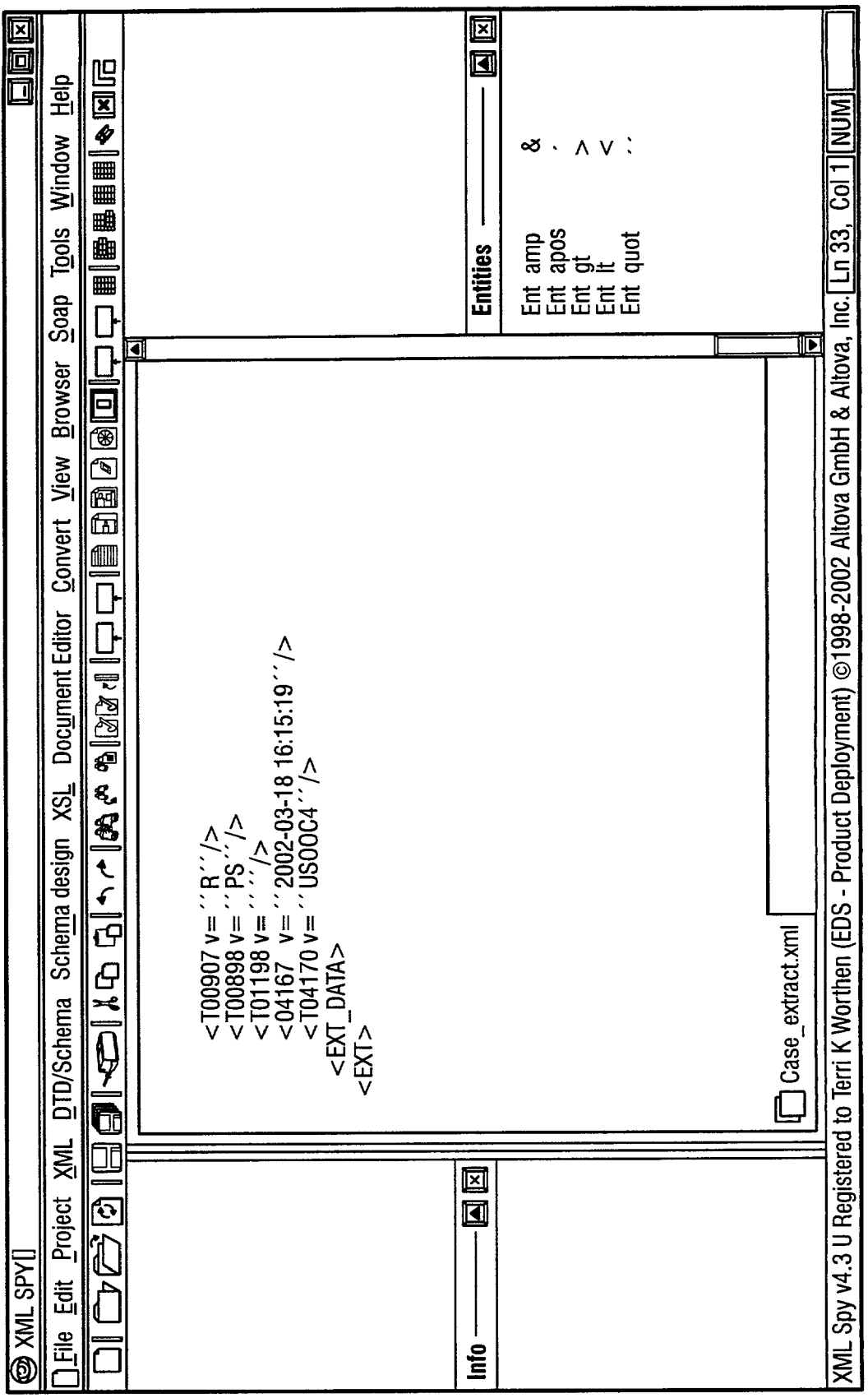
FIG. 8 shows an example of a tagged extract file produced by the process of FIG. 6 or the process of FIG. 7.

The online request and extraction (step 600) uses the correspondence master database 220 and a client information database 605 to produce a tagged extract 610. The client information database 605 contains the client-specific variable text information that must be extracted for each correspondence. The tagged extract 610 is a single package that contains an organized and tagged version of the extracted client variable text information. A sample tagged extract is shown in FIG. 8. The tagged extract may be presented in XML. The file lists a series of tags and their corresponding variable text. For example, tag 800 has an identification label T01198 and corresponds to variable text 805 "2002-03-18."

Figure 9:
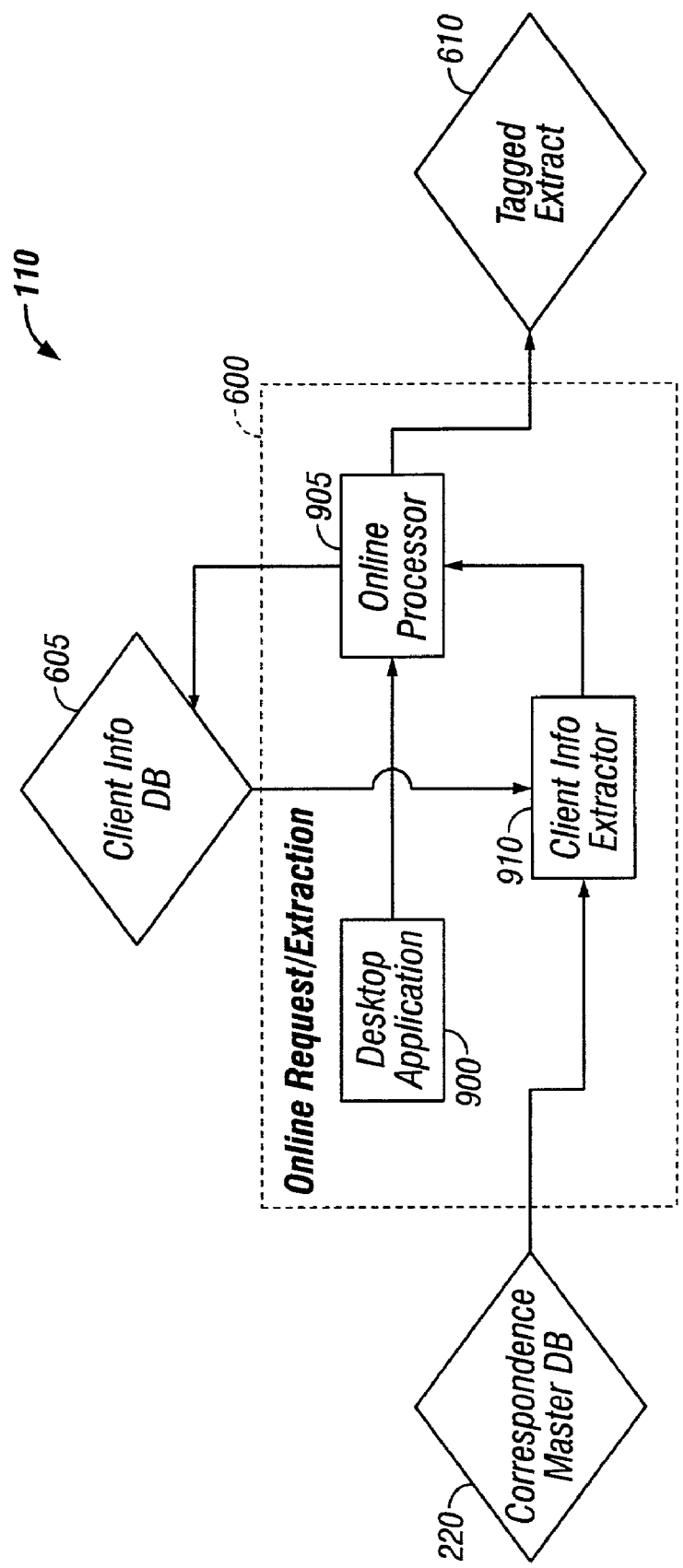
FIG. 9 is a flow chart of a process for implementing an online request and extraction step of the process of FIG. 6.

Referring to FIG. 9, a user requests correspondence using a desktop application 900. The request is sent to an online processor 905 that manages the processing request and updates the client info database 605 with the final disposition of the generation request. The online processor 905 accesses the client information extractor 910 which performs the following functions: (1) identifies the variables required for the requested correspondence by accessing the correspondence master database 220; (2) extracts the information from the client info database 605; (3) determines whether the variable has already been extracted; (4) organizes and tags the information using the published tags (e.g., T01198); and (5) consolidates the correspondence request in the tagged extract 610. The tagged extract 610 is needed for correspondence production in the rendering/delivery step 110.

Figure 10:
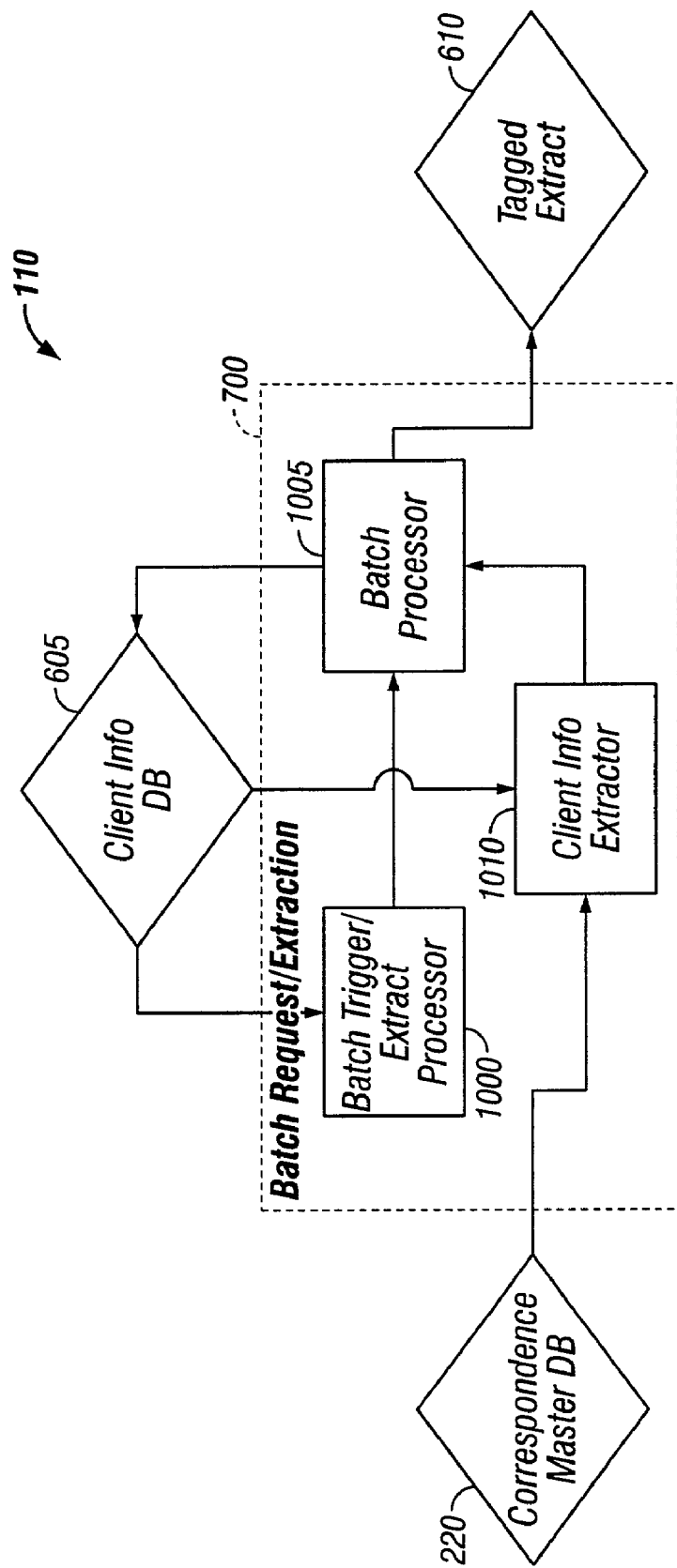
FIG. 10 is a flow chart of a process for implementing a batch request and extraction step of the process of FIG. 7.

Referring to FIGS. 7 and 10, the batch request and extraction 700 also uses the correspondence master database 220 and the client information database 605 to produce the tagged extract 610. However, the batch version 700 is different than the online version 600 in that a batch trigger/extract processor 1000 initiates the correspondence. The trigger/extract processor 1000 scans through the specific triggers in the Client Information Database 605 and calls the batch processor 1005, which manages the processing of the request in a manner analogous to that of the online processor 905. For example, the trigger/extract processor 1000 scans through a table stored in the client info database and finds that correspondence A360 needs to be generated. The trigger/extract processor 1000 informs the batch processor 1005 that correspondence A360 needs to be generated. The batch processor 1005 then accesses the client info extractor 1010 which in turn accesses the correspondence master database 220 to obtain the variable text placement for the A360 correspondence. The client info extractor 1010 operates exactly like the client info extractor 910. A single program module can, therefore, serve both types of requests.

Figure 11:
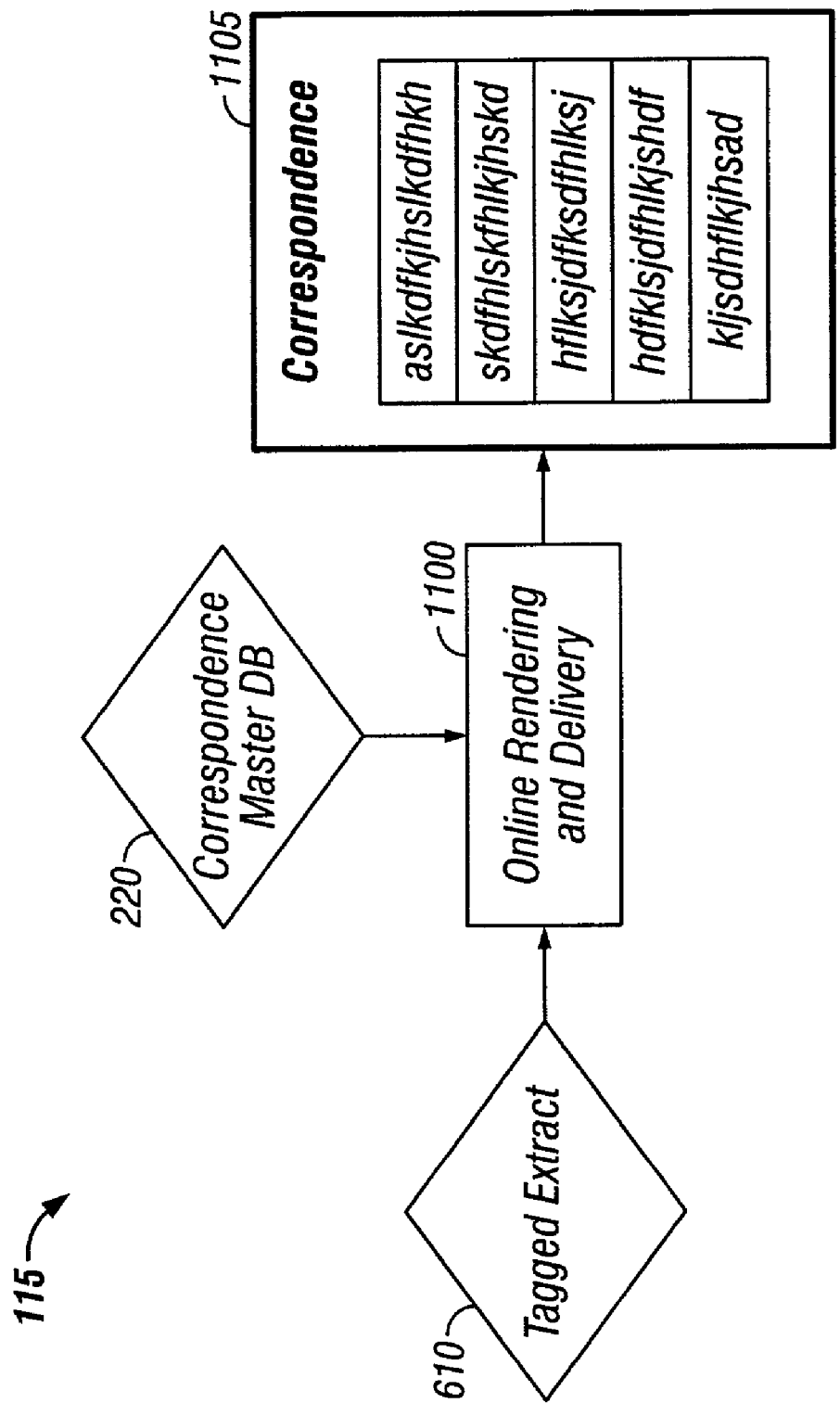
FIG. 11 is a flow chart of a process for implementing a rendering/delivery step of the process of FIG. 1.
Figure 12:
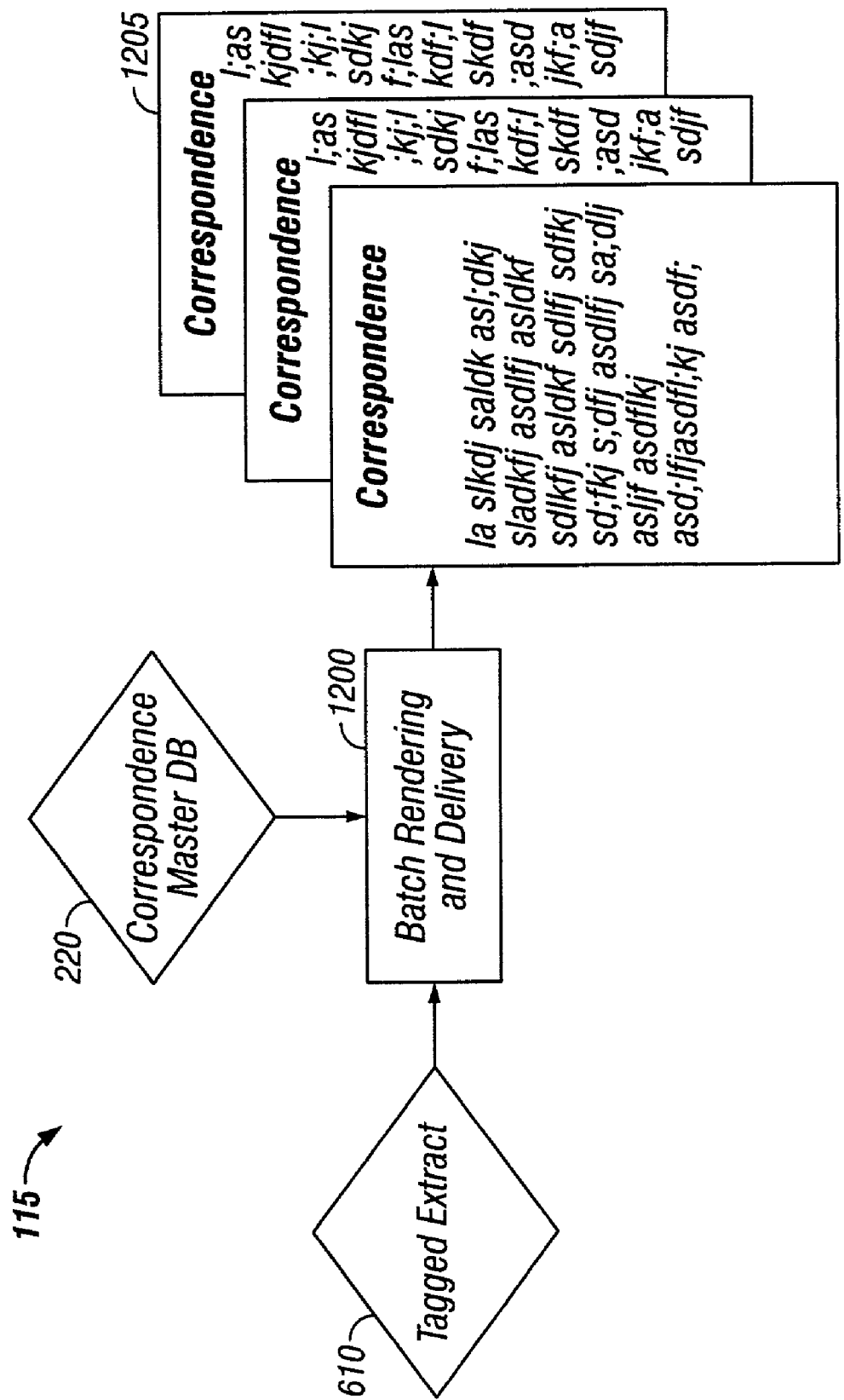
FIG. 12 is a flow chart of another process for implementing a rendering/delivery step of the process of FIG. 1.

Once the tagged extract 610 is created, it can then be rendered into the final document. Referring to FIGS. 11 and 12, the rendering and delivery step 115 processes the tagged extract 610 and formats, renders, and delivers the final document through two distinct mechanisms depending on whether the request is online (step 1100, FIG. 11) or batch (step 1200, FIG. 12).

Figure 13:
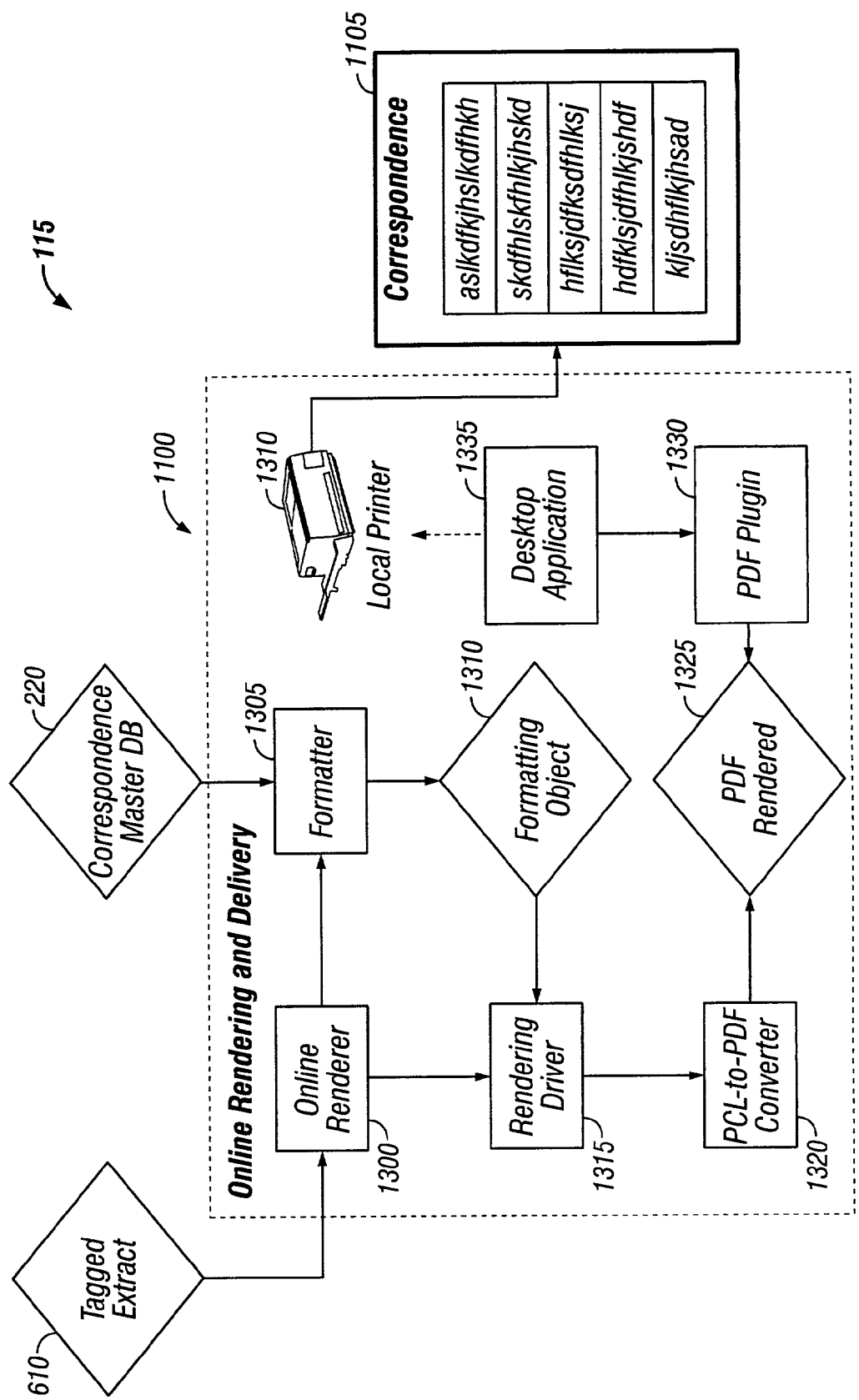
FIG. 13 is a flow chart of a process for implementing an online rendering and delivery step of the process of FIG. 11.

Referring to FIG. 13, an online renderer 1300 manages the formatting, rendering, and delivery process. The online renderer 1300 accesses a formatter 1305 which, in turn, obtains correspondence information from the correspondence master database 220 and the tagged extract 610. Specifically, the formatter 1305 obtains the correspondence variable text from the tagged extract 610 and the layout, standard text, dynamic text, and style sheet information from the correspondence master database 220. The formatter then merges the applicable variable text with the template and applies the dynamic text and style sheet information to create a formatting object 1310. The formatting object 1310 contains the full instruction set for a rendering driver 1315 to create a printable PCL version of the correspondence. Once the formatting object 1310 is created, the online renderer 1300 calls the rendering driver 1315 to create a PDF rendered version of the correspondence 1325 by using a third party tool PCL-to-PDF converter 1320. Once created, the PDF version of the correspondence 1325 is returned to the desktop application 1335 for viewing. The desktop application may view the correspondence with a PDF plugin 1330 (e.g., Adobe Acrobat). A printed version of the requested correspondence 1105 may be obtained by sending the document to a local printer 1340.

Figure 14:
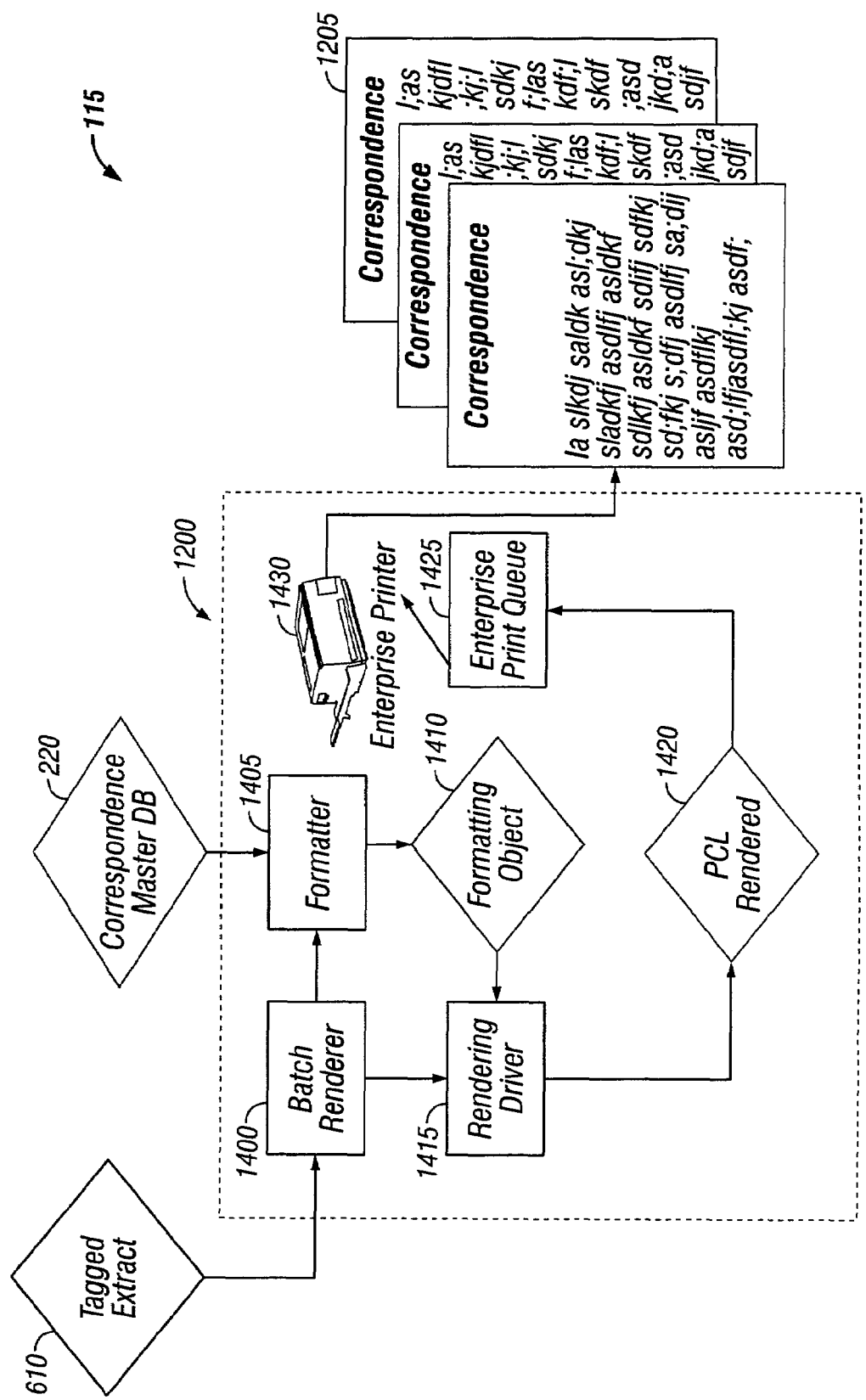
FIG. 14 is a flow chart of a process for implementing a batch rendering and delivery step of the process of FIG. 12.

Referring to FIGS. 12 and 14, the batch rendering and delivery 1200 also uses the correspondence master database 220 and the tagged extract 610 to produce pieces of correspondence 1205. However, the batch version 1200 is different than the online version 1100 in that the batch rendering and delivery focuses on the generation of multiple pieces of correspondence. A batch renderer 1400 manages the formatting, rendering, and delivery process. A formatter 1405 generates a formatting object 1410 in exactly the same way that the formatter 1305 generates the formatting object 1310 in the online rendering and delivery 1100. In fact, a single formatter program module can serve both types of requests.

Once the formatting object 1410 is created, the batch renderer 1400 calls the rendering driver 1415 to create a PCL-rendered version of the correspondence 1420. Like the formatter 1405, the rendering driver 1415 functions exactly like the rendering driver 1315 used in the online rendering and delivery. A single rendering driver program module may, therefore, be used for both types of requests. Once the PCL-rendered version 1420 is created, it may be submitted to the enterprise print queue 1425. A printed version of the requested pieces of correspondence 1205 may be obtained by printing out the document using the enterprise printer 1430.

Figure 15:
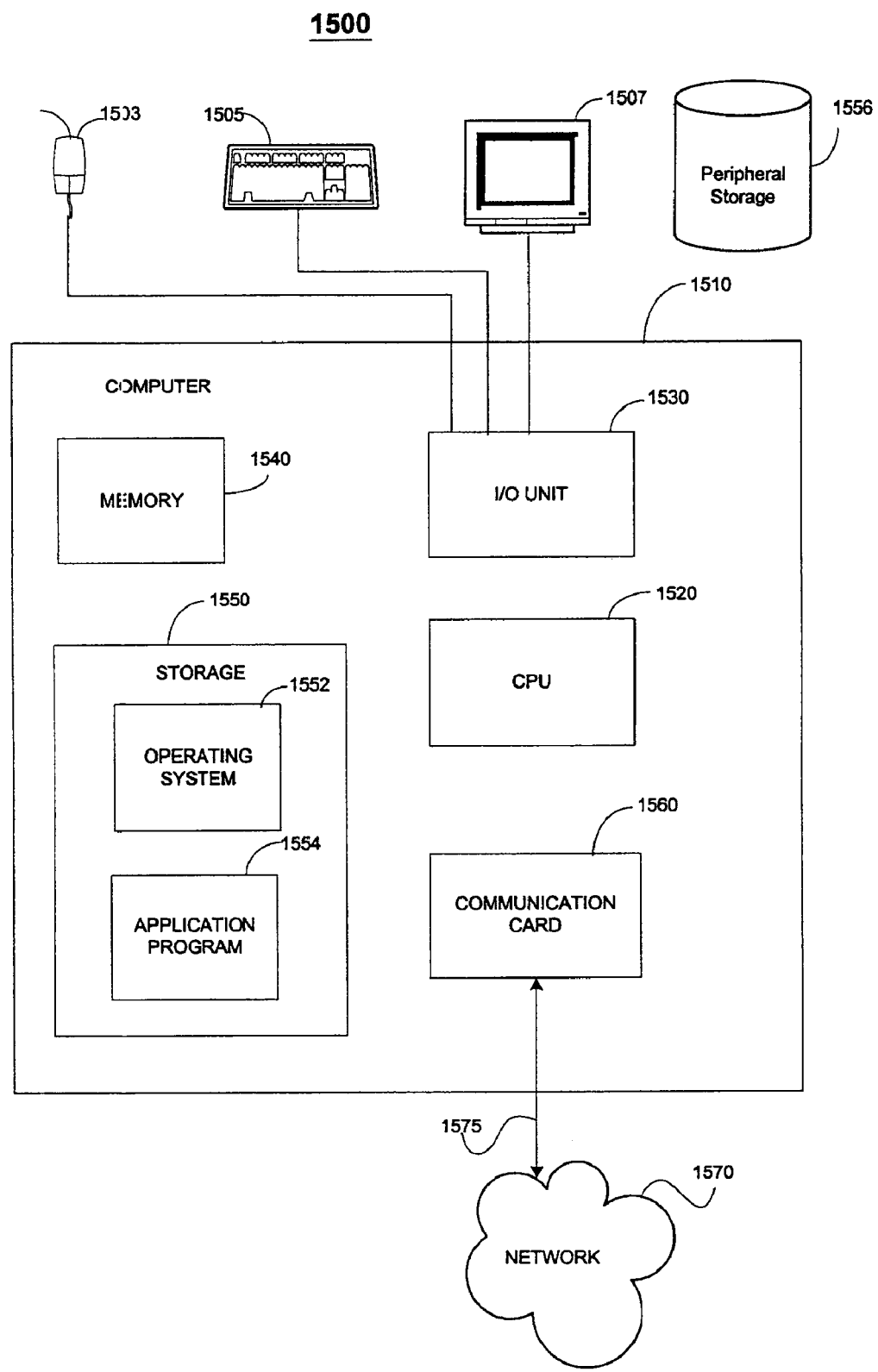
FIG. 15 is a block diagram of a computer system that may be used to implement the process of FIG. 1.

Referring to FIG. 15, a programmable system 1500 for internationalizing and automating correspondence includes a variety of input/output (I/O) devices (e.g., mouse 1503, keyboard 1505, and display 1507) and a computer 1510 having a central processor unit (CPU) 1520, an I/O unit 1530, a memory 1540, and a data storage device 1550. Data storage device 1550 may store machine-executable instructions, data, and various programs such as an operating system 1552 and one or more application programs 1554 for automatically generating correspondence in multiple languages, all of which may be processed by CPU 1520. Each computer program may be implemented in a high-level procedural or object-oriented programming language, or in assembly or machine language if desired, with the language being a compiled or interpreted language. Data storage device 1550 may be any form of non-volatile memory, including, for example, semiconductor memory devices, such as Erasable Programmable Read-Only Memory (EPROM), Electrically Erasable Programmable Read-Only Memory (EEPROM), and flash memory devices; magnetic disks, such as internal hard disks and removable disks; magneto-optical disks; and Compact Disc Read-Only Memory (CD-ROM).

System 1500 may include one or more peripheral online storage devices 1556 for storing estimating data. Peripheral online storage device 1556 may use any storage media (including magnetic, optical or solid state storage media) or any type of storage device (including a drive, a microdrive, a compact disc (CD), a CD-recordable (CD-R), a CD-rewriteable (CD-RW), a flash memory, or a solid-state floppy disk card (SSFDC)).

System 1500 also may include a communications card or device 1560 (e.g., a modem and/or a network adapter) for exchanging data with a network 1570 using a communications link 1575 (e.g., a telephone line, a wireless network link, a wired network link, or a cable network). Other examples of system 1500 may include a handheld device, a workstation, a server, a device, a component, other equipment, or some combination of these capable of responding to and executing instructions in a defined manner. Any of the foregoing may be supplemented by, or incorporated in, ASICs (application-specific integrated circuits).

Other implementations are within the scope of the following claims.

What is claimed is:

1. A computer-implemented method to automatically generate correspondence in multiple languages, the method comprising:

identifying format data portions and content data portions for pieces of correspondence, including pieces of correspondence to be generated in single-byte languages and pieces of correspondence to be generated in multi-byte languages, each of the format data portions comprising a layout and a style of a corresponding piece of correspondence and each of the content data portions comprising standard text having fixed content for all instances of the corresponding piece of correspondence and variable text having content that varies for different instances of the corresponding piece of correspondence;

storing the format data portions and the content data portions in a database capable of directly storing blocks of text in both single-byte and multi-byte languages;

receiving a request for generation of a piece of correspondence;

determining whether the request is for generation of a piece of correspondence in a multi-byte language;

accessing information specific to a recipient of the requested piece of correspondence;

automatically determining whether the information satisfies a predetermined condition;

if the request is for generation of a piece of correspondence in a multi-byte language, accessing the database to obtain the format data portion and the content data portion for the requested piece of correspondence, the content data portion including:

multiple blocks of text in a multi-byte language, the multiple blocks of text including at least one dynamic block of text associated with the predetermined condition if the information satisfies the predetermined condition, and not including the at least one dynamic block of text associated with the predetermined condition if the information does not satisfy the predetermined condition; and automatically generating the requested piece of correspondence by retrieving values for the variable text of the content data portion from a second database and using the format data portion to combine and format the standard text and the variable text corresponding to the retrieved values.

2. The method of claim 1 wherein identifying the content data portions further includes identifying dynamic text, the dynamic text comprising text that is inserted in the piece of correspondence based on the presence of some condition.

3. The method of claim 2 wherein identifying the format data portions and content data portions for pieces of correspondence includes:

gathering source files for each piece of correspondence, the source files including the layout, the style, the standard text in all supported languages, and the placement of variable text and dynamic text for the corresponding piece of correspondence;

gathering language translation files for each piece of correspondence, the language translation files including the dynamic text in all supported languages and the location of any variable text within the dynamic text; and processing the source files and language translation files to facilitate access and use of the format data portions and content data portions to generate pieces of correspondence.

4. The method of claim 3 wherein processing the source files includes transforming the layout of the source files for each piece of correspondence into printer control language macros.

5. The method of claim 3 wherein processing the source files includes identifying a placement of the variable text of each piece of correspondence from the source files and mapping the placement to a variable extract function.

6. The method of claim 3 wherein processing the source files and the language translation files includes identifying and extracting the dynamic text and the placement of the dynamic text for each piece of correspondence in preparation for storage.

7. The method of claim 3 wherein processing the source files includes identifying and extracting the style information from the source files for each piece of correspondence in preparation for storage.

8. The method of claim 3 further comprising registering the source files and language translation files in a third database to establish a chain of custody.

9. The method of claim 1 wherein receiving a request for generation of a piece of correspondence includes receiving a request for generation of a piece of correspondence automatically from a computer upon occurrence of a triggering event, the triggering event comprising a business event that initiates production of the piece of correspondence.

10. The method of claim 9 further comprising storing the triggering event data in the second database.

11. The method of claim 1 wherein receiving a request for generation of a piece of correspondence includes receiving a request for generation of a piece of correspondence from a user using a desktop application.

12. The method of claim 1 wherein automatically generating the requested piece of correspondence includes:

forming at least one block of text by accessing the database to retrieve the standard text for each block from the content data portion corresponding to the requested piece of correspondence;

retrieving values for the variable text of the content data portion for each block from a second database;

merging the standard text and the variable text corresponding to the retrieved values into one or more corresponding blocks of text; and formatting the one or more blocks of text by accessing the format data portion corresponding to the requested piece of correspondence from the database and applying the style and layout of the format data portion to the one or more blocks.

13. The method of claim 12 wherein formatting the one or more blocks of text by applying the layout and style of the format data portion to the one or more blocks of text includes changing the placement, font, and weight of the text of the one or more blocks of text and inserting the one or more blocks of text in an overall structure of the piece of correspondence, the overall structure including one or more of lines, boxes, or graphics.

14. The method of claim 1, wherein the requested piece of correspondence is a piece of correspondence to be presented to the recipient in a single language.

15. A computer system to automatically generate correspondence in multiple languages, the system comprising:

a first data store structured and arranged to store format data portions and content data portions for pieces of correspondence, including pieces of correspondence to be generated in single-byte languages and pieces of correspondence to be generated in multi-byte languages, each of the format data portions comprising a layout and a style of a corresponding piece of correspondence and each of the content data portions comprising standard text having fixed content for all instances of the corresponding pieces of correspondence and variable text having content that varies for different instances of the corresponding piece of correspondence;

a request generation processor structured and arranged to generate a request for generation of correspondence;

a second data store structured and arranged to store the variable text of the content data portion for the requested piece of correspondence;

an extraction processor structured and arranged to:
    determine whether the request is for generation of a piece of correspondence in a multi-byte language,
    access information specific to a recipient of the requested piece of correspondence,
    automatically determine whether the information satisfies a predetermined condition, and
    if the request is for generation of a piece of correspondence in a multi-byte language, access the second data store to retrieve values for the variable text of the content data portion for the requested piece of correspondence, the content data portion including:
    multiple blocks of text in a multi-byte language,
    the multiple blocks of text including at least one dynamic block of text associated with the predetermined condition if the information satisfies the predetermined condition, and not including the at least one dynamic block of text associated with the predetermined condition if the information does not satisfy the predetermined condition; and a rendering and delivery processor structured and arranged to access the first data store to obtain the format data portion and the content data portion for the requested piece of correspondence and to automatically generate the requested piece of correspondence by using the format data portion to combine and format the standard text and the variable text corresponding to the retrieved values.

16. The system of claim 15 wherein the request generation processor is configured to enable a user to request generation of the piece of correspondence using a desktop application.

17. The system of claim 15 wherein the request generation processor is configured to enable a computer to request generation of the piece of correspondence upon occurrence of a triggering event, the triggering event comprising a business event that initiates production of the piece of correspondence.

18. The system of claim 17 wherein the second data store is structured and arranged to store the triggering event data.

19. The system of claim 15 wherein the rendering and delivery processor includes:
    a formatter processor structured and arranged to access the first data store to obtain the format data portion and the content data portion of the requested piece of correspondence and to automatically generate the requested piece of correspondence by using the format data portion to combine and format the standard text and the variable text corresponding to the retrieved values;
    a rendering driver processor structured and arranged to create a printable version of the requested piece of correspondence; and
    a renderer processor structured and arranged to manage and coordinate information flow between the formatter processor and the rendering driver processor.

20. The system of claim 19 further comprising a printer capable of generating a printed version of the correspondence.

21. The system of claim 15 wherein the rendering and delivery processor is structured and arranged to automatically generate the requested piece of correspondence by:
    forming at least one block of text by accessing the first data store to retrieve the standard text for each block from the content data portion corresponding to the requested piece of correspondence;
    retrieving values for the variable text of the content data portion for each block from the second data store;
    merging the standard text and the variable text corresponding to the retrieved values into one or more corresponding blocks of text; and
    formatting the one or more blocks of text by accessing the format data portion corresponding to the requested piece of correspondence from the first data store and applying the style and layout of the format data portion to the one or more blocks.

22. The system of claim 21 wherein formatting the one or more blocks of text by applying the layout and style of the format data portion to the one or more blocks includes changing the placement, font, and weight of the text of the one or more blocks and inserting the one or more blocks in an overall structure of the piece of correspondence, the overall structure including one or more of lines, boxes, or graphics.

23. The system of claim 15, wherein the requested piece of correspondence is a piece of correspondence to be presented to the recipient in a single language.

24. A system to generate correspondence in multiple languages, the system comprising:
    one or more computer systems operable to:
        identify format data portions and content data portions for pieces of correspondence, including pieces of correspondence to be generated in single-byte languages and pieces of correspondence to be generated in multi-byte languages, each of the format data portions comprising a layout and a style of a corresponding piece of correspondence and each of the content data portions comprising standard text having fixed content for all instances of the corresponding pieces of correspondence and variable text having content that varies for different instances of the corresponding piece of correspondence;
        store the format data portions and the content data portions in a database capable of directly storing blocks of text in both single-byte and multi-byte languages;
        receive a request for generation of a piece of correspondence;
        determine whether the request is for generation of a piece of correspondence in a multi-byte language;
        access information specific to a recipient of the requested piece of correspondence;
        automatically determine whether the information satisfies a predetermined condition;
        if the request is for generation of a piece of correspondence in a multi-byte language, access the database to obtain the format data portion and the content data portion for the requested piece of correspondence, the content data portion including:
        multiple blocks of text in a multi-byte language,
        the multiple blocks of text including at least one dynamic block of text associated with the predetermined condition if the information satisfies the predetermined condition, and not including the at least one dynamic block of text associated with the predetermined condition if the information does not satisfy the predetermined condition; and
        automatically generate the requested piece of correspondence by retrieving values for the variable text of the content data portion from a second database and using the format data portion to combine and format the standard text and the variable text corresponding to the retrieved values.

25. The system of claim 24, wherein the requested piece of correspondence is a piece of correspondence to be presented to the recipient in a single language.

26. A computer system including a computer program for automatically generating correspondence in multiple languages, the computer program including code segments structured and arranged to:
identify format data portions and content data portions for pieces of correspondence, including pieces of correspondence to be generated in single-byte languages and pieces of correspondence to be generated in multi-byte languages, each of the format data portions comprising a layout and a style of a corresponding piece of correspondence and each of the content data portions comprising standard text having fixed content for all instances of the corresponding pieces of correspondence and variable text having content that varies for different instances of the corresponding piece of correspondence;
store the format data portions and the content data portions in a database capable of directly storing blocks of text in both single-byte and multi-byte languages;
receive a request for generation of a piece of correspondence in a multi-byte language;
determine whether the request is for generation of a piece of correspondence in a multi-byte language;
access information specific to a recipient of the requested piece of correspondence;
automatically determine whether the information satisfies a predetermined condition;
if the request is for generation of a piece of correspondence in a multi-byte language, access the database to obtain the format data portion and the content data portion for the requested piece of correspondence, the content data portion including:
multiple blocks of text in a multi-byte language,
the multiple blocks of text including at least one dynamic block of text associated with the predetermined condition if the information satisfies the predetermined condition, and not including the at least one dynamic block of text associated with the predetermined condition if the information does not satisfy the predetermined condition; and
automatically generate the requested piece of correspondence by retrieving values for the variable text of the content data portion from a second database and using the format data portion to combine and format the standard text and the variable text corresponding to the retrieved values.

27. The computer system of claim 26 wherein the code segment for identifying the content data portions includes a code segment for identifying dynamic text, the dynamic text comprising text that is inserted in the piece of correspondence based on the presence of some condition.

28. The computer system of claim 27 wherein the receiving code segment includes a code segment for receiving a request for generation of a piece of correspondence automatically from a computer upon occurrence of a triggering event, the triggering event comprising a business event that initiates production of the piece of correspondence.

29. The computer system of claim 27 further comprising a code segment for storing the triggering event data in the second database.

30. The computer system of claim 26 wherein the receiving code segment includes a code segment for receiving a request for generation of a piece of correspondence from a user using a desktop application.

31. The computer system of claim 26 wherein the code segment for automatically generating the correspondence includes code segments to:
form at least one block of text by accessing the database to retrieve the standard text for each block from the content data portion corresponding to the requested piece of correspondence;
retrieve values for the variable text of the content data portion for each block from a second database;
merge the standard text and the variable text corresponding to the retrieved values into one or more corresponding blocks of text; and
format the one or more blocks of text by accessing the format data portion corresponding to the requested piece of correspondence from the database and applying the style and layout of the format data portion to the one or more blocks.

32. The computer system of claim 31 wherein the formatting code segment includes a code segment for changing the placement, font, and weight of the text of the one or more blocks of text and inserting the one or more blocks of text in an overall structure of the piece of correspondence, the overall structure including one or more of lines, boxes, or graphics.

33. The computer system of claim 26 wherein the identifying code segment includes code segments to:
gather source files for each piece of correspondence, the source files including the layout, the style, the standard text in all supported languages, and the placement of variable text and dynamic text for the corresponding piece of correspondence;
gather language translation files for each piece of correspondence, the language translation files including the dynamic text in all supported languages and the location of any variable text within the dynamic text; and
process the source files and language translation files to facilitate access and use of the format data portions and content data portions to generate pieces of correspondence.

34. The computer system of claim 33 wherein the processing code segment includes a code segment for transforming the layout of the source files for each piece of correspondence into printer control language macros.

35. The computer system of claim 33 wherein the processing code segment includes a code segment for identifying a placement of the variable text of each piece of correspondence from the source files and mapping the placement to a variable extract function.

36. The computer system of claim 33 wherein the processing code segment includes a code segment for identifying and extracting the dynamic text and the placement of the dynamic text for each piece of correspondence in preparation for storage.

37. The computer system of claim 33 wherein the processing code segment includes a code segment for identifying and extracting the style information from the source files for each piece of correspondence in preparation for storage.

38. The computer system of claim 33 further comprising a codes segment for registering the source files and language translation files in a third database to establish a chain of custody.

39. The system of claim 26, wherein the requested piece of correspondence is a piece of correspondence to be presented to the recipient in a single language.

* * * * *

UNITED STATES PATENT AND TRADEMARK OFFICE
CERTIFICATE OF CORRECTION

PATENT NO. : 7,356,458 B1  
APPLICATION NO. : 10/180462  
DATED : April 8, 2008  
INVENTOR(S) : Dan G. Gonos Page 1 of 1

It is certified that error appears in the above-identified patent and that said Letters Patent is hereby corrected as shown below:

Title Pg, Item (54) Title: and column 1, lines 2-3, after "GENERATOR", insert -- BASED ON RECIPIENT INFORMATION SATISFYING PREDETERMINED CONDITION --.

Title Pg, Item (57) Abstract, line 8, after "language," insert -- if information specific to a recipient satisfies a predetermined condition --.

Column 16, claim 38, line 58, change "codes" to -- code --.

Signed and Sealed this

Eighth Day of July, 2008

JON W. DUDAS  
*Director of the United States Patent and Trademark Office*